United States Patent
Kuroda et al.

(10) Patent No.: US 12,429,575 B2
(45) Date of Patent: Sep. 30, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Jun Kuroda, Kodaira (JP); Tooru Sahara, Yokohama (JP); Fangwei Tong, Machida (JP); Takuya Homma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 360 days.

(21) Appl. No.: 18/000,749

(22) PCT Filed: Jun. 7, 2021

(86) PCT No.: PCT/JP2021/021645
§ 371 (c)(1),
(2) Date: Dec. 5, 2022

(87) PCT Pub. No.: WO2022/004291
PCT Pub. Date: Jan. 6, 2022

(65) Prior Publication Data
US 2023/0213640 A1    Jul. 6, 2023

(30) Foreign Application Priority Data

Jun. 29, 2020   (JP) ................. 2020-112079

(51) Int. Cl.
*G01S 13/536* (2006.01)
*G01S 7/35* (2006.01)
*G01S 13/931* (2020.01)

(52) U.S. Cl.
CPC ........... *G01S 13/536* (2013.01); *G01S 7/352* (2013.01); *G01S 13/931* (2013.01)

(58) Field of Classification Search
None
See application file for complete search history.

(56) References Cited

U.S. PATENT DOCUMENTS

| 8,112,223 | B2 | 2/2012 | Jordan et al. |
| 9,746,554 | B2 | 8/2017 | Millar et al. |
| 10,430,659 | B2 | 10/2019 | Jiang et al. |

(Continued)

FOREIGN PATENT DOCUMENTS

| CN | 109584183 B | * | 5/2020 | ............ G06T 3/005 |
| JP | 2011-191227 A | | 9/2011 | |

(Continued)

*Primary Examiner* — Timothy A Brainard
(74) *Attorney, Agent, or Firm* — Studebaker Brackett PLLC

(57) ABSTRACT

An electronic device includes a transmission antenna, a reception antenna, and a signal processor. The transmission antenna is configured to transmit a transmission wave. The reception antenna is configured to receive a reflection wave resulting from reflection of the transmission wave. The signal processor is configured to detect an object based on a transmission signal transmitted as the transmission wave and a reception signal received as the reflection wave. The signal processor is configured to output information regarding a point group representing the position of an object determined to be a stationary object based on the velocity of the object and the velocity of the electronic device.

14 Claims, 15 Drawing Sheets

(56) References Cited

U.S. PATENT DOCUMENTS

| 10,853,687 B2 | 12/2020 | Yan et al. |
| 2010/0271257 A1 | 10/2010 | Hirogari et al. |
| 2017/0356991 A1 | 12/2017 | Yosoku et al. |
| 2020/0041647 A1* | 2/2020 | Danziger ............... G01S 7/4817 |
| 2020/0256999 A1* | 8/2020 | Yellepeddi .............. G01S 17/89 |
| 2021/0341598 A1 | 11/2021 | Sahara et al. |

FOREIGN PATENT DOCUMENTS

| JP | 2019-133646 A | 8/2019 | |
| WO | WO-2006013689 A1 * | 2/2006 | ........... G01S 13/726 |
| WO | 2017/020466 A1 | 2/2017 | |
| WO | 2020/075689 A1 | 4/2020 | |

* cited by examiner

FIG. 4
SUBFRAME 1
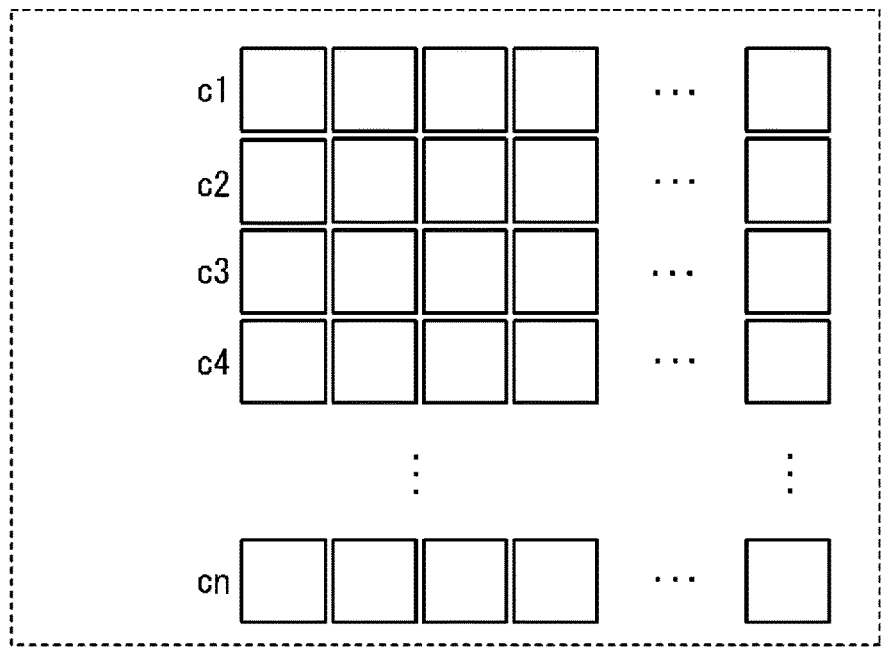
SUBFRAME N
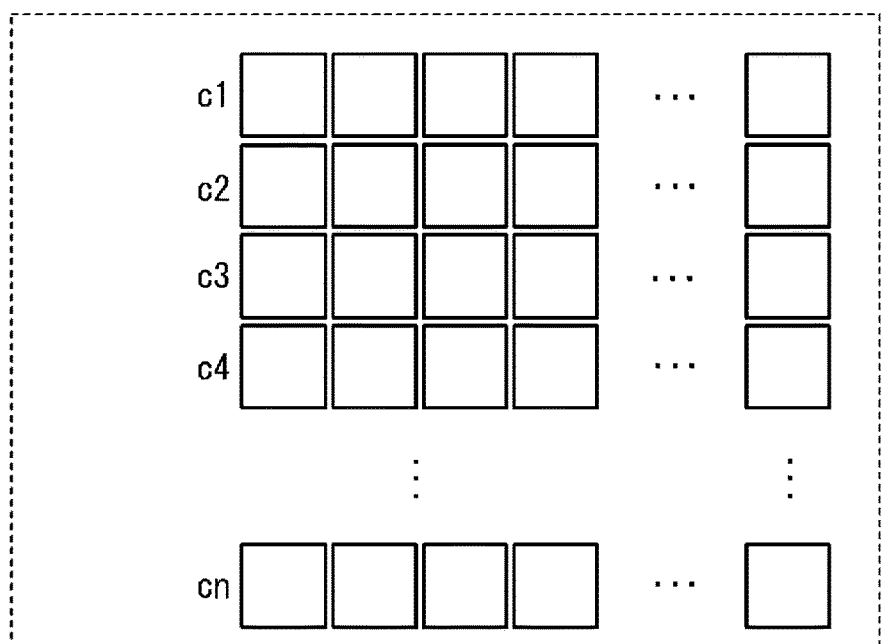

ELECTRONIC DEVICE, METHOD FOR CONTROLLING ELECTRONIC DEVICE, AND PROGRAM

CROSS-REFERENCE TO RELATED APPLICATIONS

This application claims priority of Japanese Patent Application No. 2020-112079 filed in Japan on Jun. 29, 2020, the entire disclosure of which is hereby incorporated by reference.

TECHNICAL FIELD

The present disclosure relates to an electronic device, a method for controlling an electronic device, and a program.

BACKGROUND OF INVENTION

In fields such as industries related to automobiles, for example, technologies for measuring the distance between a host vehicle and a prescribed object are becoming increasingly important. In particular, in recent years, various studies have been conducted on radar (radio detecting and ranging (RADAR)) technologies. In these technologies, the distance to an object is measured by transmitting radio waves, such as millimeter waves, and receiving waves reflected from an object, such as an obstacle. It is expected that the importance of such technologies for measuring distances so forth will continue to increase in the future with the development of technologies for assisting drivers in driving and technologies related to automated driving that allow part or all of the driving process to be automated.

In the technologies described above, there have also been attempts to grasp the shape and/or size, and so on of a detected object by plotting positions of the object as a point group. Thus, there have been proposals regarding technologies in which a detected object is handled as a point group, such as the following. Patent Literature 1 details a proposal regarding point group data matching as an invention relating to radar and laser-based radar (LiDAR) point groups. Furthermore, Patent Literature 2 makes a proposal regarding a method of recognizing urban roads based on laser point groups.

CITATION LIST

Patent Literature

Patent Literature 1: Japanese Unexamined Patent Application Publication No. 2019-133646
Patent Literature 2: International Publication No. WO 2017/020466

SUMMARY

In an embodiment, an electronic device includes a transmission antenna, a reception antenna, and a signal processor.

The transmission antenna is configured to transmit a transmission wave.

The reception antenna is configured to receive a reflection wave resulting from reflection of the transmission wave.

The signal processor is configured to detect an object based on a transmission signal transmitted as the transmission wave and a reception signal received as the reflection wave.

The signal processor outputs information regarding a point group representing a position of an object determined to be a stationary object based on a velocity of the object and a velocity of the electronic device.

In an embodiment, a method for controlling an electronic device includes transmitting a transmission wave using a transmission antenna, receiving a reflection wave resulting from reflection of the transmission wave using a reception antenna, detecting an object based on a transmission signal transmitted as the transmission wave and a reception signal received as the reflection wave, and outputting information representing a position of an object determined to be a stationary object based on a velocity of the object and a velocity of the electronic device.

In an embodiment, a program causes a computer to execute transmitting a transmission wave using a transmission antenna, receiving a reflection wave resulting from reflection of the transmission wave using a reception antenna, detecting an object based on a transmission signal transmitted as the transmission wave and a reception signal received as the reflection wave, and outputting information representing a position of an object determined to be a stationary object based on a velocity of the object and a velocity of the electronic device.

BRIEF DESCRIPTION OF THE DRAWINGS

FIG. 4 is a diagram for describing processing of a signal performed by the electronic device according to the embodiment.

DESCRIPTION OF EMBODIMENTS

Figure 1:
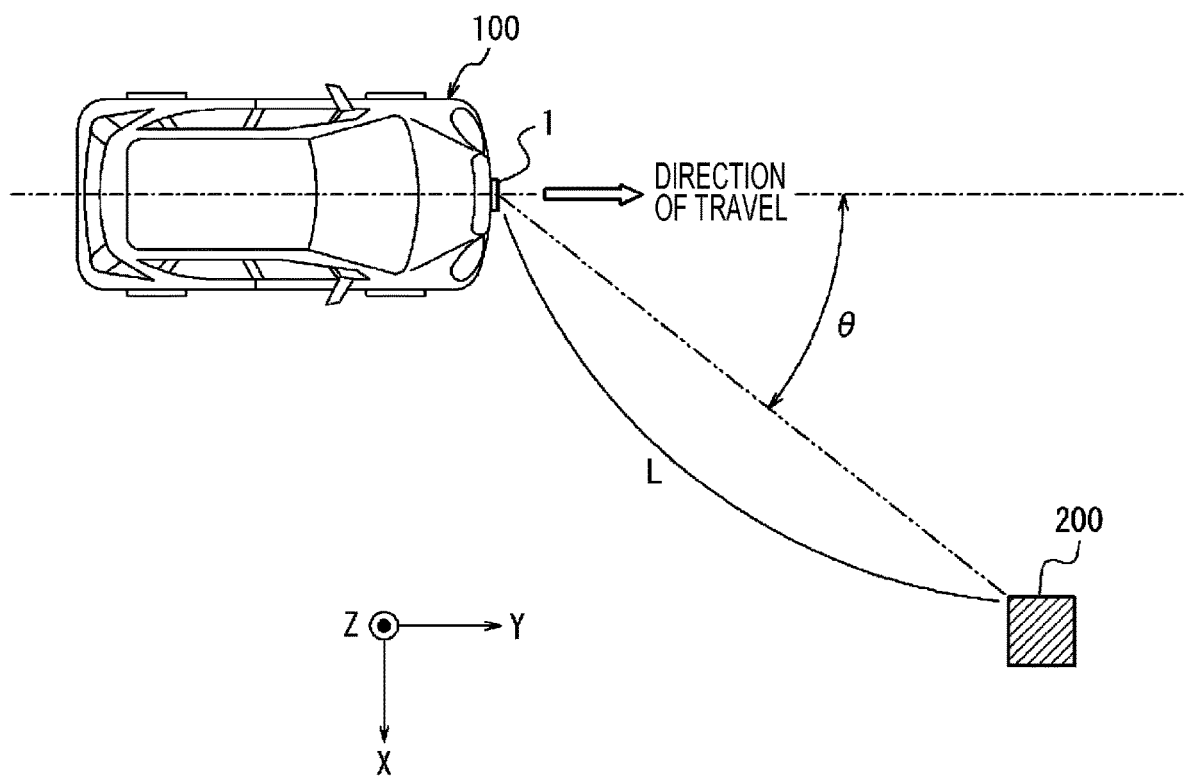
FIG. 1 is a diagram for describing a usage state of an electronic device according to an embodiment.

In a technology for detecting a prescribed object by receiving a reflection wave resulting from a transmitted transmission wave being reflected off an object, it is desirable to improve the accuracy with which a target is detected. An object of the present disclosure is to provide an electronic device, a method for controlling an electronic device, and a program that can improve the accuracy with which an object target is detected. According to an embodiment, an electronic device, a method for controlling an electronic device, and a program that can improve the accuracy with which an object target is detected can be provided. Hereafter, an embodiment will be described in detail while referring to the drawings.

An electronic device according to an embodiment is installed in a vehicle (mobile object) such as an automobile and is capable of detecting a prescribed object located in the surroundings of the mobile object as a target. Accordingly, the electronic device according to the embodiment can transmit a transmission wave into the surroundings of the mobile object from a transmission antenna installed in the mobile object. In addition, the electronic device according to the embodiment can receive a reflection wave from a reception antenna installed in the mobile object, the reflection wave being generated by the transmission wave being reflected. At least one out of the transmission antenna and the reception antenna may be, for example, provided in a radar sensor or the like installed in the mobile object.

Hereinafter, as a typical example, a configuration will be described in which the electronic device according to the embodiment is installed in an automobile such as a passenger vehicle. However, the electronic device according to the embodiment is not limited to being installed in an automobile. The electronic device of the embodiment may be installed in any of a variety of mobile objects such as self-driving cars, buses, taxis, trucks, motorcycles, bicycles, ships, aircraft, helicopters, agricultural equipment such as tractors, snowplows, sweepers, police cars, ambulances, and drones. Furthermore, the electronic device according to the embodiment is not necessarily limited to being installed in mobile objects that move under their own power. For example, the mobile object in which the electronic device according to the embodiment is installed may be a trailer part towed by a tractor. The electronic device according to the embodiment can measure the distance between a sensor and a prescribed object or the like in a situation where at least one out of the sensor and the object is able to move. The electronic device according to the embodiment can measure the distance between the sensor and the object or the like even when both the sensor and the object are stationary.

First, an example of detection of an object performed by the electronic device according to the embodiment will be described.

FIG. 1 is a diagram for describing a usage state of the electronic device according to the embodiment. FIG. 1 illustrates an example in which the electronic device according to the embodiment is installed in a mobile object, the electronic device being equipped with a transmission antenna and a reception antenna.

An electronic device 1 according to the embodiment is installed in a mobile object 100 illustrated in FIG. 1. The electronic device 1 includes a transmission antenna and a reception antenna. The electronic device 1 according to the embodiment may be installed in (for example, built into) the mobile object 100 illustrated in FIG. 1. The specific configuration of the electronic device 1 will be described below. As described below, the electronic device 1 may include, for example, at least one out of a transmission antenna and a reception antenna. The mobile object 100 illustrated in FIG. 1 may be a vehicle such as an automobile like a passenger car, but may be any suitable type of mobile object. In FIG. 1, the mobile object 100 may, for example, be moving (traveling or slowing down) in the positive Y-axis direction (direction of travel) indicated in the figure, may be moving in another direction, or may be stationary and not moving.

As illustrated in FIG. 1, the electronic device 1 including a transmission antenna is installed in the mobile object 100. In the example illustrated in FIG. 1, only one electronic device 1, which includes a transmission antenna and a reception antenna, is installed at the front of the mobile object 100. The position where the electronic device 1 is installed on or in the mobile object 100 is not limited to the position illustrated in FIG. 1, and may be another position, as appropriate. For example, the electronic device 1 illustrated in FIG. 1 may be installed at the left side, the right side, and/or the rear of the mobile object 100. The number of electronic devices 1 may be any suitable number of one or more depending on various conditions (or requirements) such as the range and/or accuracy of measurement in the mobile object 100. The electronic device 1 may be installed inside the mobile object 100. The inside of the mobile object 100 may be, for example, the space inside a bumper, the space inside the body, the space inside a headlight, or the operating space.

The electronic device 1 transmits an electromagnetic wave as a transmission wave from the transmission antenna. For example, when there is a prescribed object (for example, an object 200 illustrated in FIG. 1) in the surroundings of the mobile object 100, at least part of a transmission wave transmitted from the electronic device 1 will be reflected by the object and become a reflection wave. The reflection wave is, for example, received by the reception antenna of the electronic device 1, and in this way, the electronic device 1 installed in the mobile object 100 is able to detect the object as a target.

The electronic device 1 including the transmission antenna may typically be a radar (radio detecting and ranging (RADAR)) sensor that transmits and receives radio waves. However, the electronic device 1 is not limited to being a radar sensor. The electronic device 1 according to the embodiment may be a sensor based on light detection and ranging or laser imaging detection and ranging (LIDAR) technologies utilizing light waves. These kind of sensors may include patch antennas, for example. Since technologies such as RADAR and LIDAR are already well known, detailed description thereof may be simplified or omitted as appropriate.

The electronic device 1 installed in the mobile object 100 illustrated in FIG. 1 receives, from the reception antenna, a reflection wave generated from a transmission wave transmitted from the transmission antenna. In this way, the electronic device 1 can detect the prescribed object 200 existing within a prescribed distance from the mobile object 100 as a target. For example, as illustrated in FIG. 1, the electronic device 1 can measure a distance L between the mobile object 100, which is the host vehicle, and the prescribed object 200. The electronic device 1 can also measure the relative velocity of the mobile object 100, which is the host vehicle, and the prescribed object 200. The electronic device 1 can also measure the direction (arrival angle θ) in which the reflection wave reflected from the prescribed object 200 arrives at the mobile object 100, which is the host vehicle.

The object 200 may be at least one out of, for example, an oncoming vehicle traveling in a lane adjacent to the mobile object 100, a car traveling next to the mobile object 100, and vehicles in front of and behind and traveling in the same lane as the mobile object 100. The object 200 may be any object that exists around the mobile object 100 such as a motorcycle, a bicycle, a stroller, a person such as a pedestrian, a living organism such as an animal or an insect, a guardrail, a median strip, a road sign, a sidewalk step, a wall, a manhole, or an obstacle. In addition, the object 200 may be in motion or stationary. For example, the object 200 may be an automobile that is parked or stationary in the surroundings of the mobile object 100.

In FIG. 1, the ratio of the size of the electronic device 1 to the size of the mobile object 100 does not necessarily represent the actual ratio. In FIG. 1, a state is illustrated in which the electronic device 1 is installed on the outside of the mobile object 100. However, in an embodiment, the electronic device 1 may be installed at any of various positions on or in the mobile object 100. For example, in an embodiment, the electronic device 1 may be installed inside a bumper of the mobile object 100 so that the electronic device 1 does not appear outside the mobile object 100.

Hereinafter, as a typical example, the transmission antenna of the electronic device 1 will be described as transmitting radio waves in a frequency band such as a millimeter wave band (greater than or equal to 30 GHz) or a quasi-millimeter wave band (for example, around 20 GHz to 30 GHz). For example, the transmission antenna of a sensor 5 may transmit radio waves with a frequency bandwidth of 4 GHz, such as from 77 GHz to 81 GHz.

Figure 2:
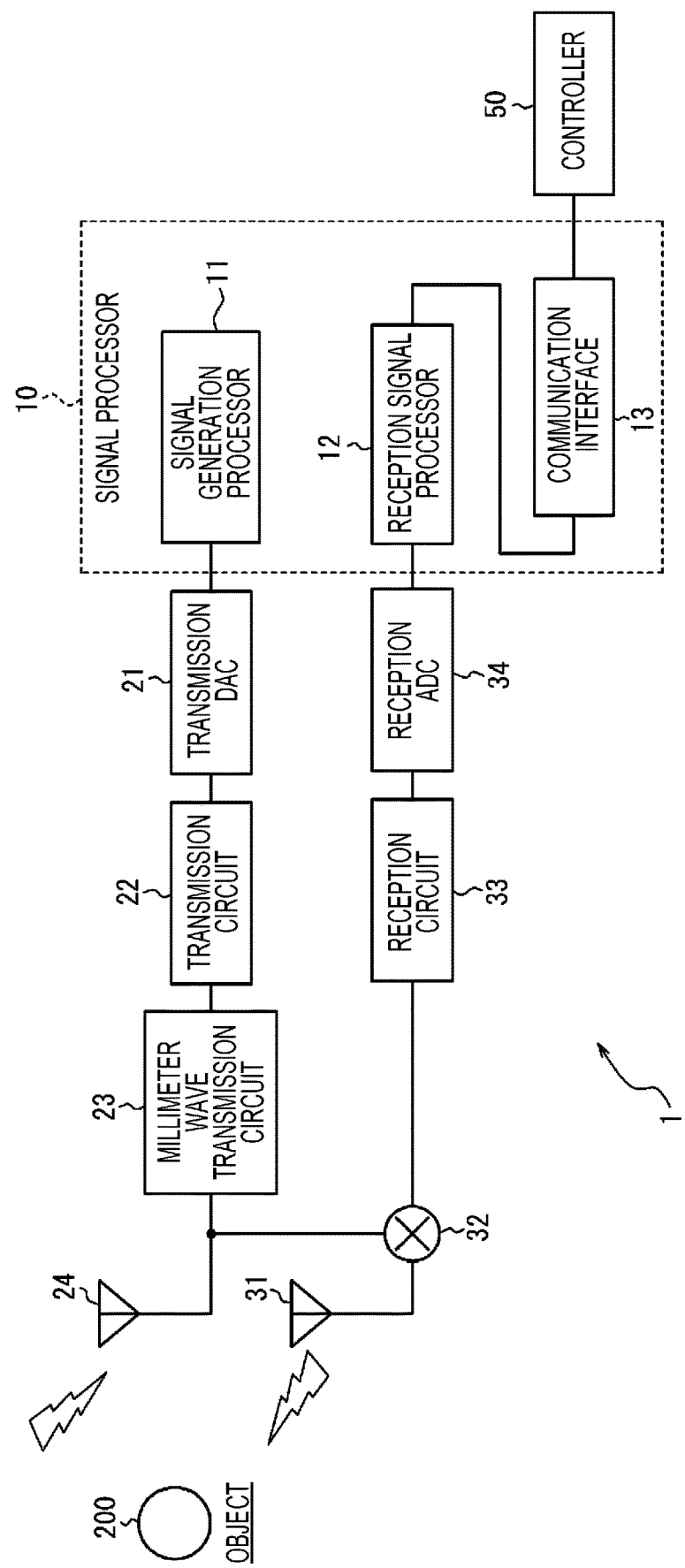
FIG. 2 is a functional block diagram schematically illustrating the configuration of the electronic device according to the embodiment.

FIG. 2 is a functional block diagram schematically illustrating an example configuration of an electronic device 1 according to an embodiment. Hereafter, an example of the configuration of the electronic device 1 according to the embodiment will be described.

Frequency-modulated continuous wave radar (hereinafter referred to as FMCW radar) is often used to measure distances using millimeter-wave radar. In FMCW radar, the transmission signal is generated by sweeping the frequency of the radio waves to be transmitted. Therefore, for example, in a millimeter-wave FMCW radar that uses radio waves in the 79 GHz frequency band, the frequency of the radio waves being used will have a frequency bandwidth of 4 GHz, for example, from 77 GHz to 81 GHz. Radar in the 79 GHz frequency band is characterized by having a wider usable frequency bandwidth than other millimeter/quasi-millimeter wave radars, for example, in the 24 GHz, 60 GHz, and 76 GHz frequency bands. Hereafter, such an embodiment will be described as an example.

As illustrated in FIG. 2, the electronic device 1 according to the embodiment includes a signal processor 10. The signal processor 10 may include a signal generation processor 11, a reception signal processor 12, and a communication interface 13. The electronic device 1 according to the embodiment includes a transmission DAC 21, a transmission circuit 22, a millimeter wave transmission circuit 23, and a transmission antenna array 24 as a transmission section. The electronic device 1 according to the embodiment further includes a reception antenna array 31, a mixer 32, a reception circuit 33, and a reception ADC 34 as a reception section. The electronic device 1 according to the embodiment does not have to include all of the functional units illustrated in FIG. 2 and may include functional units other than those illustrated in FIG. 2. The electronic device 1 illustrated in FIG. 2 may be configured using circuits that are basically the same as those used in general radars that use electromagnetic waves in the millimeter wave band or the like. However, in the electronic device 1 according to the embodiment, signal processing performed by the signal processor 10 includes processing that differs from that performed by general radars of the related art.

The signal processor 10 of the electronic device 1 according to the embodiment can control overall operation of the electronic device 1 including control of each functional unit constituting the electronic device 1. In particular, the signal processor 10 performs various types of processing on the signals handled by electronic device 1. The signal processor 10 may include at least one processor, such as a central processing unit (CPU) or a digital signal processor (DSP), in order to provide control and processing power to perform various functions. The signal processor 10 may be implemented collectively in a single processor, in several processors, or in individual processors. The processors may be implemented as a single integrated circuit. An integrated circuit may also be referred to as an IC. Processors may be implemented as multiple integrated circuits and discrete circuits connected so as to be able to communicate with each other. The processors may be realized based on various other known technologies. In the embodiment, the signal processor 10 may be configured, for example, as a CPU (hardware) and a program (software) executed by the CPU. The signal processor 10 may appropriately include a memory as needed for the operation of signal processor 10.

The signal generation processor 11 of the signal processor 10 generates a signal to be transmitted from the electronic device 1. In the electronic device 1 according to the embodiment, the signal generation processor 11 may generate a transmission signal (transmission chirp signal), such as a chirp signal. In particular, the signal generation processor 11 may generate a signal having a frequency that varies periodically and linearly (linear chirp signal). For example, the signal generation processor 11 may generate a chirp signal whose frequency periodically and linearly increases from 77 GHz to 81 GHz over time. For example, the signal generation processor 11 may generate a signal whose frequency periodically repeatedly linearly increases (up chirp) and decreases (down chirp) from 77 GHz to 81 GHz over time. The signal generated by the signal generation processor 11 may be set in advance in the signal processor 10, for example. The signal generated by the signal generation processor 11 may be stored in advance in a storage unit of the signal processor 10, for example. Since chirp signals used in technical fields such as radar are known, detailed description thereof will be simplified or omitted as appropriate. The signal generated by the signal generation processor 11 is supplied to the transmission DAC 21. Therefore, the signal generation processor 11 may be connected to the transmission DAC 21.

The transmission digital-to-analog converter (DAC) 21 has a function of converting a digital signal supplied from the signal generation processor 11 into an analog signal. The DAC 21 may include a general analog-to-digital converter. The signal generated by the analog conversion performed by the transmission DAC 21 is supplied to the transmission circuit 22. Therefore, the transmission DAC 21 may be connected to the transmission circuit 22.

The transmission circuit 22 has a function of converting the signal produced by the analog conversion performed by the transmission DAC 21 into a signal of an intermediate frequency (IF) band. The transmission circuit 22 may include a general IF band transmission circuit. A signal produced by processing performed by the transmission circuit 22 is supplied to the millimeter wave transmission circuit 23. Therefore, the transmission circuit 22 may be connected to the millimeter wave transmission circuit 23.

The millimeter wave transmission circuit 23 has a function of transmitting a signal produced by processing performed by the transmission circuit 22 as a millimeter wave (RF wave). The millimeter wave transmission circuit 23 may include a general millimeter wave transmission circuit. The signal produced by processing performed by the millimeter wave transmission circuit 23 is supplied to the transmission antenna array 24. Therefore, the millimeter wave transmission circuit 23 may be connected to the transmission antenna array 24. The signal produced by the processing performed by the millimeter wave transmission circuit 23 is also supplied to the mixer 32. Therefore, the millimeter wave transmission circuit 23 may also be connected to the mixer 32.

The transmission antenna array 24 is configured by arranging multiple transmission antennas in an array pattern. In FIG. 2, the configuration of the transmission antenna array 24 is illustrated in a simplified manner. The transmission antenna array 24 transmits the signal produced by processing performed by the millimeter wave transmission circuit 23 to outside the electronic device 1. The transmission antenna array 24 may include a transmission antenna array used in a general millimeter-wave radar.

Thus, the electronic device 1 according to the embodiment includes the transmission antenna array 24 and can transmit a transmission signal (for example, a transmission chirp signal) as a transmission wave from the transmission antenna array 24.

For example, as illustrated in FIG. 2, a case in which the object 200 exists in the surroundings of the electronic device 1 is assumed. In this case, at least part of the transmission wave transmitted from the transmission antenna array 24 is reflected by the object 200. At least part of the wave reflected by object 200 out of the transmission wave transmitted from the transmission antenna array 24 may be reflected towards the reception antenna array 31.

The reception antenna array 31 receives the reflection wave. Here, the reflection wave may be at least part of the wave reflected by the object 200 out of the transmission wave transmitted from the transmission antenna array 24.

The reception antenna array 31 is configured by arranging multiple reception antennas in an array pattern. In FIG. 2, the configuration of the reception antenna array 31 is illustrated in a simplified manner. The reception antenna array 31 receives a reflection wave resulting from reflection of the transmission wave transmitted from the transmission antenna array 24. The reception antenna array 31 may include a reception antenna array used in a typical millimeter-wave radar. The reception antenna array 31 supplies a reception signal received as a reflection wave to the mixer 32. Therefore, the reception antenna array 31 may be connected to the mixer 32.

The mixer 32 converts the signal produced by processing performed by millimeter wave transmission circuit 23 (transmission signal) and the reception signal received by reception antenna array 31 into a signal of an intermediate frequency (IF) bandwidth. The mixer 32 may include a mixer used in a general millimeter wave radar. The mixer 32 supplies the resulting combined signal to the reception circuit 33. Therefore, the mixer 32 may be connected to the reception circuit 33.

The reception circuit 33 has a function of analog processing the signal converted to an IF band by the mixer 32. The reception circuit 33 may include a typical reception circuit that converts a signal into an IF band. A signal produced by processing performed by the reception circuit 33 is supplied to the reception ADC 34. Therefore, the reception circuit 33 may be connected to the reception ADC 34.

The reception analog-to-digital converter (ADC) 34 has a function of converting the analog signal supplied from the reception circuit 33 into a digital signal. The ADC 34 may include a general analog-to-digital converter. A signal digitized by the reception ADC 34 is supplied to the reception signal processor 12 of the signal processor 10. Therefore, the reception ADC 34 may be connected to the signal processor 10.

The reception signal processor 12 of the signal processor 10 has a function of performing various types of processing on a digital signal supplied from the reception DAC 34. For example, the reception signal processor 12 calculates the distance from the electronic device 1 to the object 200 (distance measurement) based on the digital signal supplied from the reception DAC 34. The reception signal processor 12 calculates the velocity of the object 200 relative to the electronic device 1 (velocity measurement) based on the digital signal supplied from the reception DAC 34. The reception signal processor 12 calculates the azimuth angle of the object 200 as seen from the electronic device 1 (angle measurement) based on the digital signal supplied from the reception DAC 34. Specifically, I/Q converted data may be input to the reception signal processor 12. In response to input of the data, the reception signal processor 12 performs a fast Fourier transform (2D-FFT) in distance (Range) and velocity (Velocity) directions, respectively. After that, the reception signal processor 12 suppresses false alarms and makes the probability of false alarms constant by removing noise points through, for example, universal asynchronous receiver transmitter (UART) and/or constant false alarm rate (CFAR) processing. The reception signal processor 12 then obtains the position of the object 200 by, for example, performing arrival angle estimation for a point that satisfies the CFAR criteria. The information generated as a result of the distance, velocity, and angle measurements performed by reception signal processor 12 is supplied to communication interface 13.

The communication interface 13 of the signal processor 10 includes an interface that outputs information from the signal processor 10, for example, to an external controller 50. The communication interface 13 outputs information on at least any one of the position, velocity, and angle of the object 200, for example, as a controller area network (CAN) signal to outside the signal processor 10. Information on at least any one of the position, velocity, and angle of the object 200 is supplied to the controller 50 via the communication interface 13. Therefore, the communication interface 13 may be connected to the signal processor 10.

As illustrated in FIG. 2, the electronic device 1 according to the embodiment may be connected to the controller 50, for example, an electronic control unit (ECU), in a wireless or wired manner. The controller 50 controls various operations of the mobile object 100. The controller 50 may consist of at least one ECU.

Figure 3:
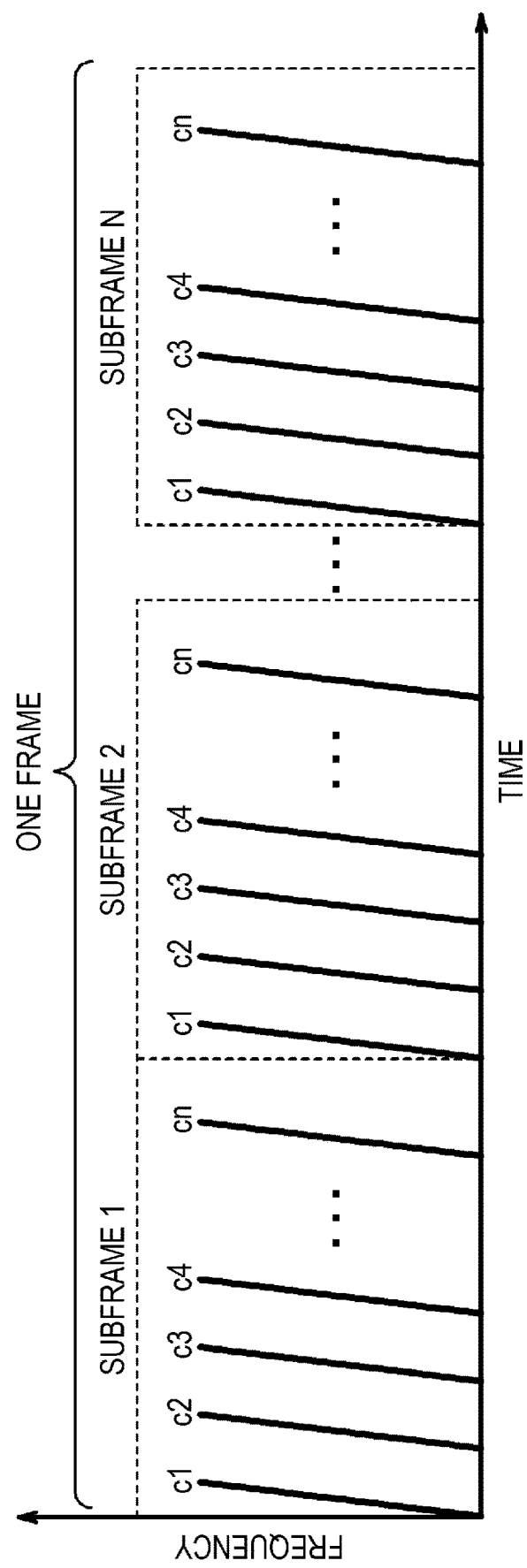
FIG. 3 is a diagram for describing the configuration of a signal processed by the electronic device according to the embodiment.

FIG. 3 is a diagram for explaining an example of chirp signals generated by the signal generation processor 11 of the signal processor 10.

FIG. 3 illustrates the temporal structure of one frame when a fast-chirp modulation (FCM) method is used. FIG. 3 illustrates an example of a reception signal of an FCM method. FCM is a method in which chirp signals, represented in FIG. 3 as $c_1$, $c_2$, $c_3$, $c_4$, ..., $c_n$, are repeated at short intervals (for example, greater than or equal to the round trip time between the radar and the object target for electromagnetic waves calculated from the maximum measurement distance). In FCM, for convenience of signal processing of reception signals, transmission and reception processing is often performed by dividing a signal into subframe units as illustrated in FIG. 3.

In FIG. 3, the horizontal axis represents the passage of time and the vertical axis represents frequency. In the example illustrated in FIG. 3, the signal generation processor 11 generates linear chirp signals whose frequency varies periodically and linearly. In FIG. 3, the chirp signals are illustrated as $c_1$, $c_2$, $c_3$, $c_4$, ..., $c_n$. As illustrated in FIG. 3, in each chirp signal, the frequency increases linearly with time.

In the example illustrated in FIG. 3, several chirp signals are included illustrated as $c_1$, $c_2$, $c_3$, $c_4$, ..., $c_n$ and make up one subframe. That is, subframe 1, subframe 2, and so on illustrated in FIG. 3 are each composed of several chirp signals $c_1$, $c_2$, $c_3$, $c_4$, ..., $c_n$. In the example illustrated in FIG. 3, several subframes are included, such as subframe 1, subframe subframe N, and make up one frame. In other words, the one frame illustrated in FIG. 3 consists of N subframes. The one frame illustrated in FIG. 3 may be frame 1, and may be followed by frame 2, frame 3, ..., and so on. Each of these frames may consist of N subframes, similarly to frame 1. A frame interval of a prescribed length may be included between the frames. The one frame illustrated in FIG. 3 may have a length of around 30 to 50 milliseconds, for example.

In the electronic device 1 according to the embodiment, the signal generation processor 11 may generate a transmission signal having a suitable number of frames. In FIG. 3, illustration of some of the chirp signals is omitted. Thus, the relationship between the time and frequency of the transmission signal generated by signal generation processor 11 may be stored, for example, in a storage unit of the signal processor 10.

Thus, the electronic device 1 according to the embodiment may transmit a transmission signal consisting of a subframe containing multiple chirp signals. The electronic device 1 according to the embodiment may transmit a transmission signal consisting of a frame containing a prescribed number of subframes.

Hereafter, the electronic device 1 will be described as transmitting a transmission signal having the frame structure illustrated in FIG. 3. However, the frame structure illustrated in FIG. 3 is merely an example and, for example, the number of chirp signals included in one subframe may be set as appropriate. In other words, in the embodiment, the signal generation processor 11 may generate a subframe containing a suitable number (for example, a suitable plurality of) chirp signals. The subframe structure illustrated in FIG. 3 is also merely an example and the number of subframes included in one frame may be set as appropriate. In other words, in the embodiment, the signal generation processor 11 may generate a frame containing a suitable number (for example, a suitable plurality of) subframes. The signal generation processor 11 may generate signals having different frequencies. The signal generation processor 11 may generate multiple discrete signals of bandwidths having different frequencies f.

FIG. 4 is a diagram illustrating part of the subframes in FIG. 3 in a different manner. FIG. 4 illustrates samples of a reception signal resulting from reception of the transmission signal illustrated in FIG. 3 obtained by performing a two-dimensional fast Fourier transform (2D-FFT). The 2D-FFT is a process performed in the reception signal processor 12 (FIG. 2) of the signal processor 10.

As illustrated in FIG. 4, the chirp signals $c_1$, $c_2$, $c_3$, $c_4$, ..., $c_n$ are stored in the individual subframes, i.e., subframe 1, ..., subframe N. In FIG. 4, the chirp signals $c_1$, $c_2$, $c_3$, $c_4$, ..., $c_n$ each consist of samples represented by a horizontally arrayed row of squares. The reception signal illustrated in FIG. 4 is subjected to 2D-FFT, CFAR, and integrated signal processing for each subframe in the reception signal processor 12 illustrated in FIG. 2.

Figure 5:
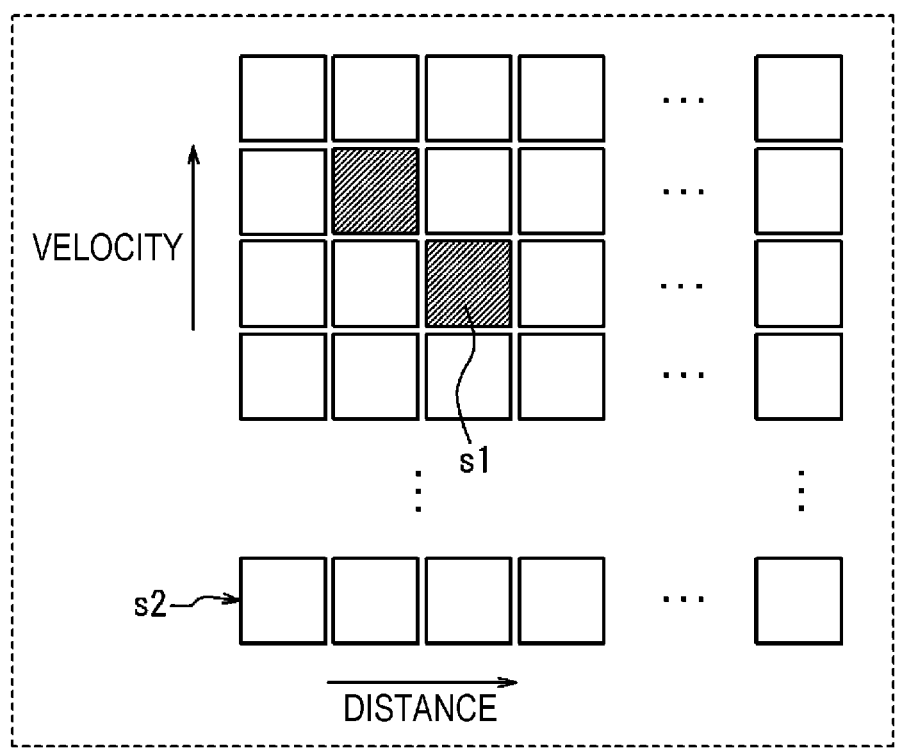
FIG. 5 is a diagram for describing processing of a signal performed by the electronic device according to the embodiment.

FIG. 5 illustrates an example of a point group on a range-Doppler (distance-velocity) plane calculated by performing 2D-FFT, CFAR, and integrated signal processing of each subframe in the reception signal processor 12 illustrated in FIG. 2.

In FIG. 5, the horizontal direction represents range (distance) and the vertical direction represents velocity. A shaded point group s1, illustrated in FIG. 5, is a group of points representing a signal that exceeds the CFAR threshold process. An unshaded point group s2, illustrated in FIG. 5, illustrates a bin (2D-FFT sample) that did not exceed the CFAR threshold and does not have point group. For the point groups on the range-Doppler plane calculated in FIG. 5, the direction from the radar is calculated by direction estimation, and the position and velocity on a 2-D plane are calculated as a point group representing the object 200. Here, the direction estimation may be calculated using beamformers and/or subspace methods. Examples of typical subspace method algorithms include multiple signal classification (MUSIC) and estimation of signal parameters via rotation invariance technique (ESPRIT).

Figure 6:
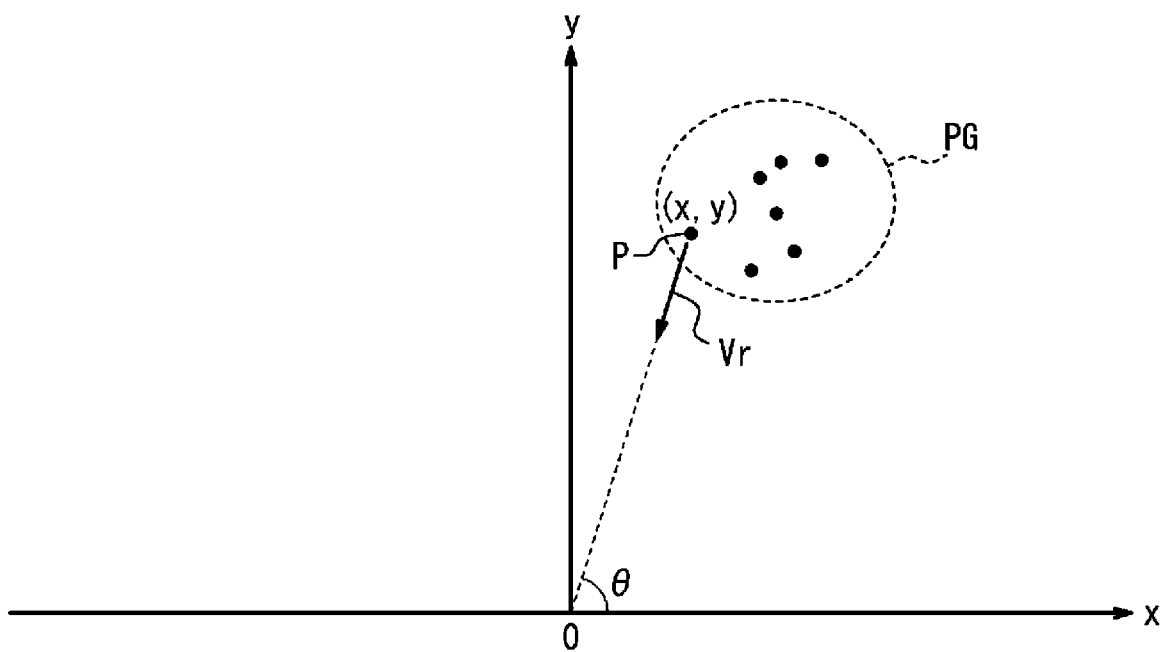
FIG. 6 is a diagram for describing processing of a signal performed by the electronic device according to the embodiment.

FIG. 6 illustrates an example of results obtained by the reception signal processor 12 transforming the point group coordinates from the range-Doppler plane illustrated in FIG. 5 to the XY plane after the direction estimation. As illustrated in FIG. 6, the reception signal processor 12 is able to plot a point group PG on the XY plane. The point group PG is made up of individual points P. Each point P has an angle θ and a radial velocity Vr in polar coordinates.

Next, in description of the operation of the electronic device 1 according to the embodiment, first, the current state of the art of a typical millimeter-wave will be described.

Hereafter, a millimeter wave band is assumed to include a 24 GHz band (21.65 GHz to 26.65 GHz), a 60 GHz band (60 GHz to 61 GHz), a 76 GHz band (76 GHz to 77 GHz), and a 79 GHz band (77 GHz to 81 GHz). In general, among radars using electromagnetic waves in the millimeter wave band, in radars for monitoring so-called short-range and medium-range objects, it is desirable to have a high spatial density for point groups generated as detection points of objects in order to monitor objects in the surroundings. If the spatial density of point groups is high, not only the position but also the shape of the object in the surroundings can be accurately observed.

On the other hand, in radar, the spatial density of point groups generated within a prescribed time period, referred to as a frame, may be constrained by the following physical constraints and/or signal processing factors.

(1) Limitations of diffraction depending on the wavelength of electromagnetic waves
(2) Resolution of distance with respect to pulse width of transmission wave (3) Distance resolution and/or velocity resolution due to constraints such as signal configuration and number of fast Fourier transform (FFT) points.
(4) Decrease in angular separation performance due to a decrease in the noise and signal level ratio (signal-to-noise ratio) (when a subspace method is used)
(5) Constraints on the amount of calculation or memory capacity in the processor (CPU, DSP, or FPGA, and so on)
(6) Constrictions due to the speed (baudrate) of communication output by an output interface 30 to an external device Among the factors that constrain the spatial density of a point group described above, (1) tends to be due to the physical constraints of electromagnetic radiation between the transmission antenna array 24, the reception antenna array 31, and the object 200. (2) tends to be due to the signal generation processor 11 of the signal processor 10. (3), (4), and (5) tend to be due to the reception signal processor 12 of the signal processor 10. (6) tends to be related to the communication interface 13 and the controller 50.

In general millimeter-wave radar technologies, one XY plot illustrated in FIG. 5 is drawn for the single frame illustrated in FIG. 3. In this case, however, the factors (1) to (6) listed above make it difficult to generate point groups having sufficiently high spatial density. The higher the spatial density of point groups generated based on the reception signal, the easier it is to obtain information such as the shape and/or size of the object being detected. In other words, the system is desirably configured so that the spatial density of point groups generated based on the reception signal is as high as possible. The electronic device 1 according to the embodiment can increase the spatial density of point groups generated based on the reception signal. Hereafter, such an embodiment will be described.

First Embodiment

Figure 7:
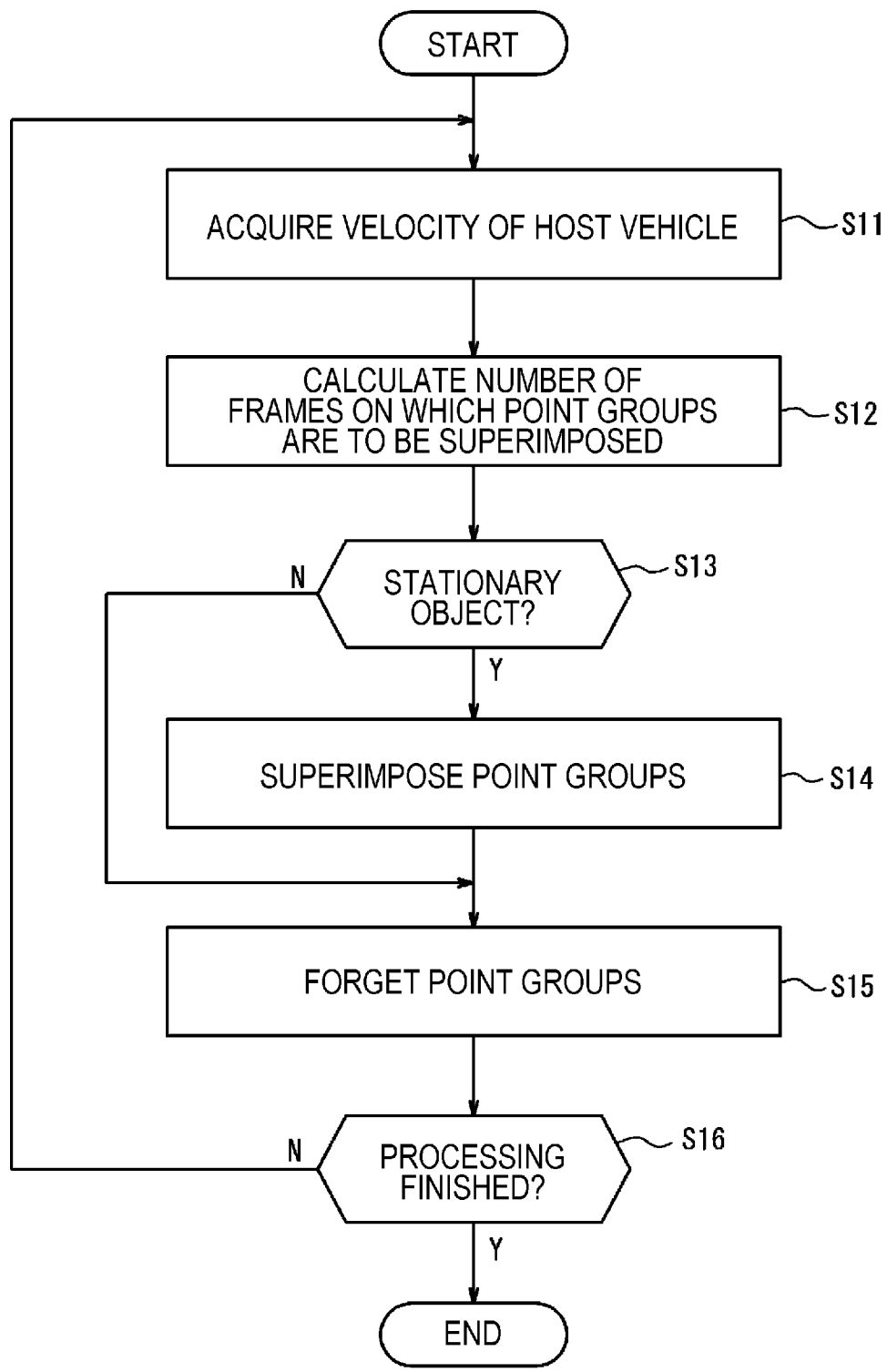
FIG. 7 is a flowchart for describing operation of the electronic device according to the embodiment.

FIG. 7 is a flowchart for describing an operation (signal processing) performed by the signal processor 10 of the electronic device 1 according to the embodiment. Specifically, FIG. 7 may be a flowchart illustrating point group superimposition processing performed by the signal processor 10 of the electronic device 1. In the electronic device 1 according to the embodiment, calculation processing for estimating the angle of arrival may be performed by the signal processor 10 or the reception signal processor 12 of the signal processor 10.

Figure 8:
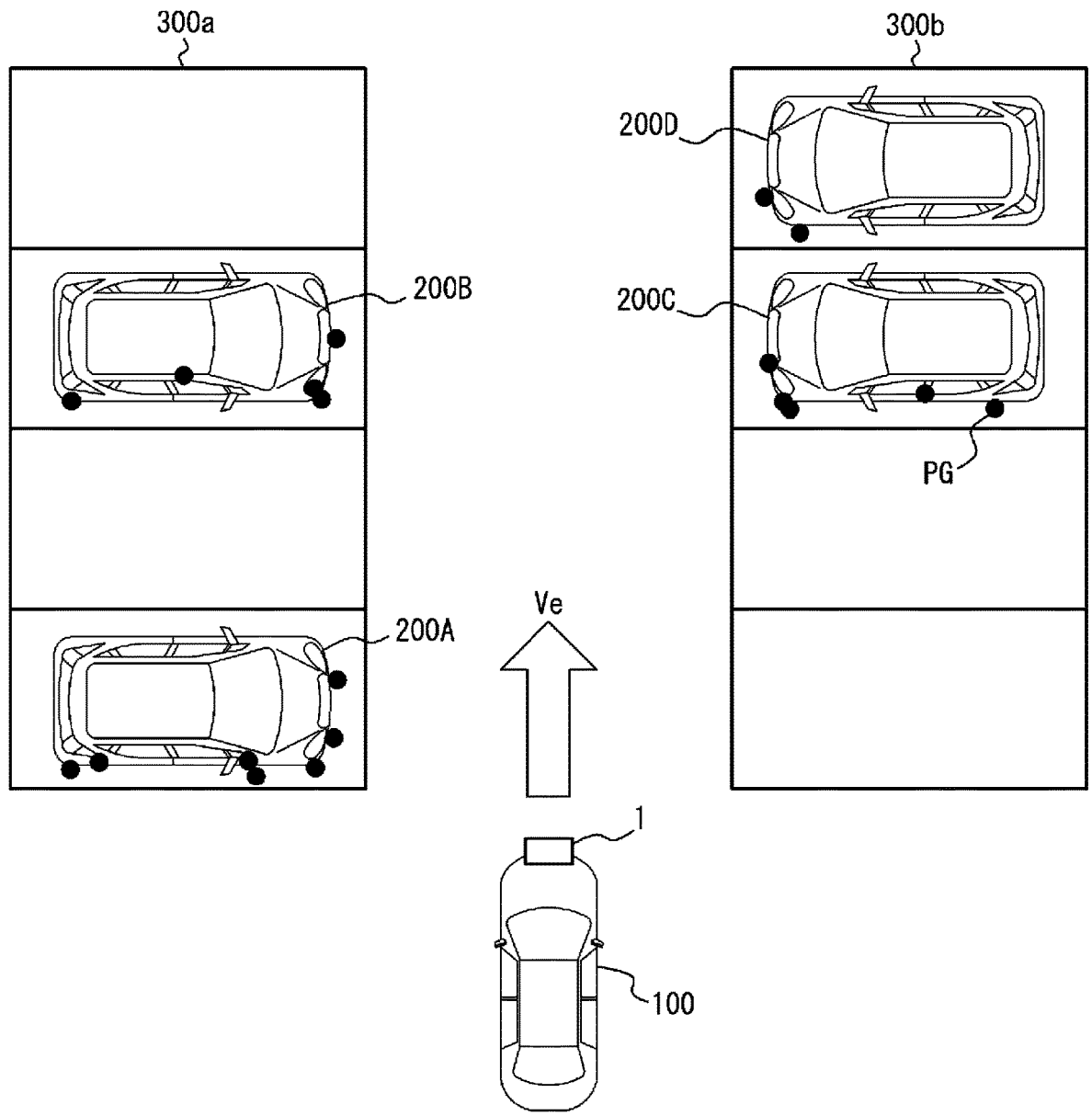
FIG. 8 is a diagram illustrating a comparative example of an operation performed by the electronic device according to the embodiment.

Once the operation illustrated in FIG. 8 begins, the signal processor 10 acquires the movement velocity of the host vehicle (mobile object 100 in which the electronic device 1 is installed) (Step S11). In Step S11, the signal processor 10 may acquire the movement velocity of the mobile object 100 from the controller 50, for example. For example, the controller 50, which includes an ECU, may transmit the measurement values of a sensor, such as a sensor that detects rotation of the wheels of the mobile object 100, via a CAN bus. Thus, in this embodiment, the electronic device 1 may be installed in a prescribed mobile object such as the mobile object 100. In this case, the signal processor 10 may obtain information on the velocity of the electronic device 1 as the velocity of the mobile object 100 from a controller (for example, an ECU) that controls a prescribed mobile object, such as the mobile object 100.

After acquiring the movement velocity of the host vehicle in Step S11, the signal processor 10 calculates the number of frames on which point groups are to be superimposed (Step S12). In Step S12, the signal processor 10 may calculate the number of superimposition frames based on the movement velocity of the host vehicle, for example, using the following Equation (1). In this case, however, Ve≠0, i.e., the vehicle is not stationary.

[Math 1]

$$N = \text{round}\left(\frac{\Delta r}{T\|Ve\|}\right) \quad (1)$$

Here, N is the number of frames on which point groups are to be superimposed, Ar is the acceptable error for the distance of a point group from the radar, T is the time length of the frame, and Ve is the velocity vector of the host vehicle. In Equation (1), rounding of the calculated result is performed in order to make the number of calculated frames an integer (for example, a natural number) rather than a fraction. In the First Embodiment, the signal processor 10 may calculate the number of frames N on which point groups are to be superimposed as a number that varies dynamically in accordance with the velocity of the host vehicle.

Equation (1) illustrates that the number of frames on which point groups are to be superimposed is adjusted so as to be within the acceptable distance error Ar. The acceptable distance error Ar can be regarded as being one indicator of the distance resolution of a point group, which is determined from the number of FFT points and the maximum measurement distance.

On the other hand, when the host vehicle is stationary, i.e., Ve=0, the right side of Equation (1) will diverge to infinity. In this case, the signal processor 10 may calculate the number of superimposition frames N in Step S12 as a maximum value Nmax allowed by the system such as the memory. That is, in Step S12, when Ve=0, the number of superimposition frames N can be expressed as Equation (2) below.

$$N = N\text{max} \quad (2)$$

After calculating the number of frames on which point groups are to be superimposed in Step S12, the signal processor 10 determines whether the detected object is stationary or not (Step S13). That is, in Step S13, the signal processor 10 determines whether each point group detected belongs to a stationary object or a moving object.

Generally, in radar technologies, only the radial velocity Vr can be measured, as illustrated in FIG. 6. In the actual specification providing the effects of this embodiment, it is unlikely that there will be an object moving with a high velocity in a direction tangential to a concentric circle viewed from the electronic device 1. Therefore, in Step S13, the signal processor 10 may identify stationary and moving objects in the following way. In other words, a movement velocity Vp of an object can be expressed as the sum of a movement velocity Ve of the host vehicle and a radial velocity Vs of a point group, as in Equation (3) below.

$$Vp = Ve + Vs \quad (3)$$

Therefore, in Step S13, the signal processor 10 can determine whether a detected object is stationary or not by setting a threshold Vth in the following Equation (4) as appropriate.

[Math 2]

$$\|V\| < Vth \quad (4)$$

In other words, in Step S13, the signal processor 10 may determine that the detected object is stationary when the magnitude of a velocity vector V is smaller than the threshold Vth. On the other hand, in Step S13, the signal processor 10 may determine that the detected object is moving when the magnitude of the velocity vector V is not smaller than the threshold Vth.

When it is determined that the object is stationary in Step S13, the signal processor 10 superimposes point groups representing the object (Step S14). On the other hand, when it is determined that the object is not stationary, i.e., is moving in Step S13, the signal processor 10 skips Step S14. In other words, in this case, the signal processor 10 does not superimpose point groups representing the object.

In Step S14, the signal processor 10 may, as actual processing, convert the Doppler axis of the range-Doppler plot illustrated in FIG. 5 into an axis representing the magnitude of the vector Vp using Equation (3). Then, in Step S14, the signal processor 10 may perform point group superimposition processing only for point groups that belong within a range of a few bins centered at 0 (about 1 or 2 bins).

When superimposing point groups in Step S14, the signal processor 10 may assign frame numbers from 1 to N to the point groups to be superimposed. This allows the signal processor 10 to grasp the order of the point groups from new to old.

Thus, in an embodiment, the signal processor 10 may output point group information by superimposing points representing the position of an object determined to be a stationary object, for example, based on the velocity of the object 200 and the velocity of the electronic device 1. On the other hand, the signal processor 10 may output point group information without superimposing points representing the position of an object determined not to be a stationary object, for example, based on the velocity of the object 200 and the velocity of the electronic device 1. As illustrated in Step S12, the signal processor 10 may output point group information by superimposing the position of an object determined to be a stationary object at a time defined by at least one frame of the transmission wave or the reception wave.

In particular, in this embodiment, the signal processor 10 may determine the number of the at least one frame mentioned above in accordance with the velocity of the electronic device 1, for example. For example, when the velocity of the electronic device 1 is not zero, the signal processor 10 may determine the number of the at least one frame mentioned above based on the allowable range of an error of the distance from the electronic device 1 to the object 200. On the other hand, when the velocity of the electronic device 1 is zero, the signal processor 10 may determine the number of the at least one frame mentioned above based on the maximum number allowed in the system of the electronic device 1.

When the object is determined not to be stationary in Step S13, or when point groups are superimposed in Step S14, the signal processor 10 may perform processing to forget a point group in Step S15. In Step S15, the signal processor 10 may erase a point group corresponding to one old frame among all the superimposed point groups. As a result of the processing performed in Step S15, the electronic device 1 can prevent the number of superimposed point groups from continuing to increase. Thus, in this embodiment, signal processor 10 may perform processing to forget point group information at a prescribed timing.

Once the processing for forgetting a point group has been performed in Step S15, the signal processor 10 determines whether or not the signal processor 10 has been instructed to end the processing illustrated in FIG. 7 (Step S16). In Step S16, when the signal processor 10 has been instructed to end the processing illustrated in FIG. 7, the signal processor 10 may end the processing illustrated in FIG. 7. On the other hand, in Step S16, when the signal processor 10 has not been instructed to end the processing illustrated in FIG. 7, the signal processor 10 may return to Step S11 and continue the processing.

Figure 9:
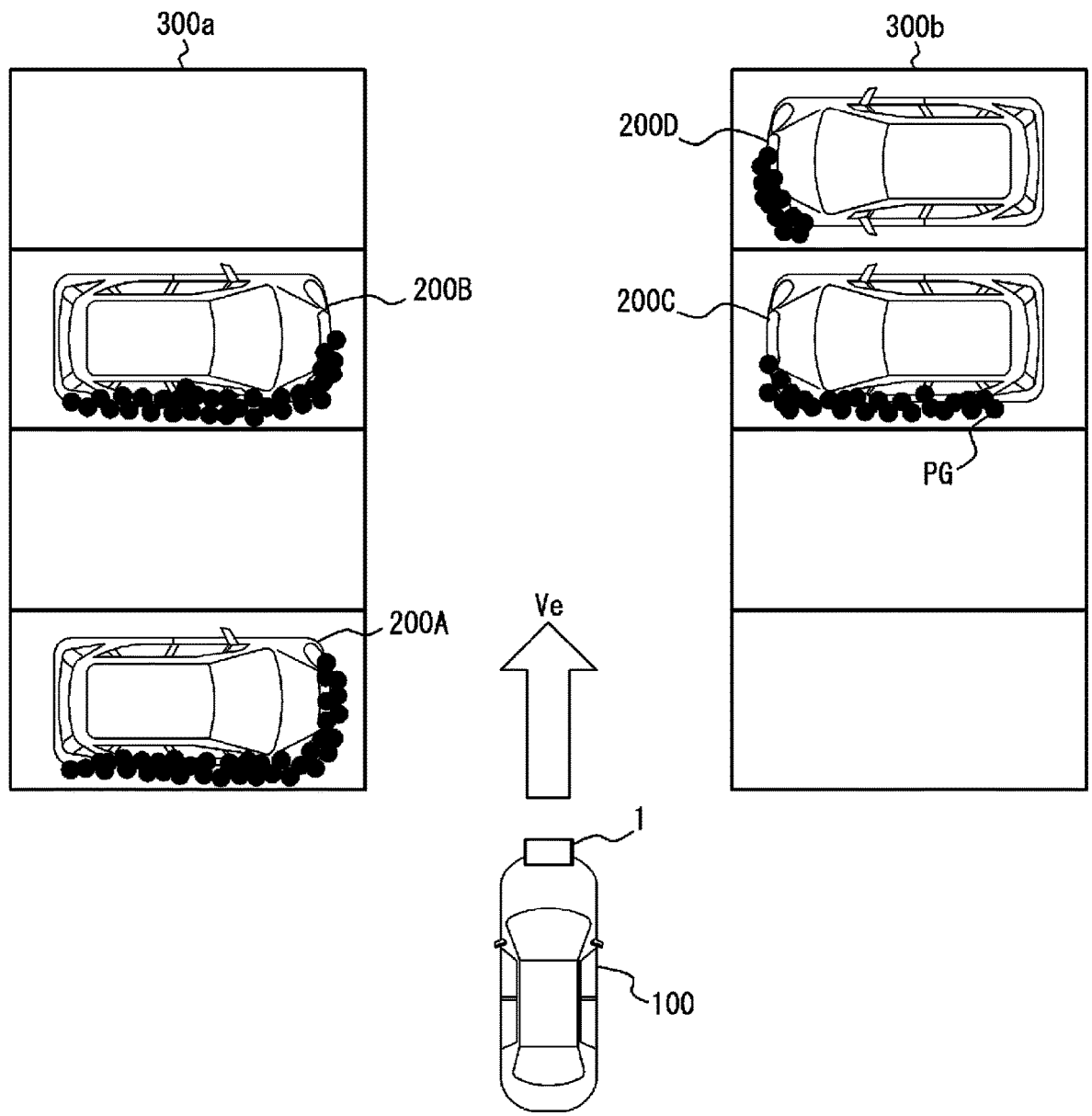
FIG. 9 is a diagram illustrating an example of an operation performed by the electronic device according to the embodiment.
Figure 10:
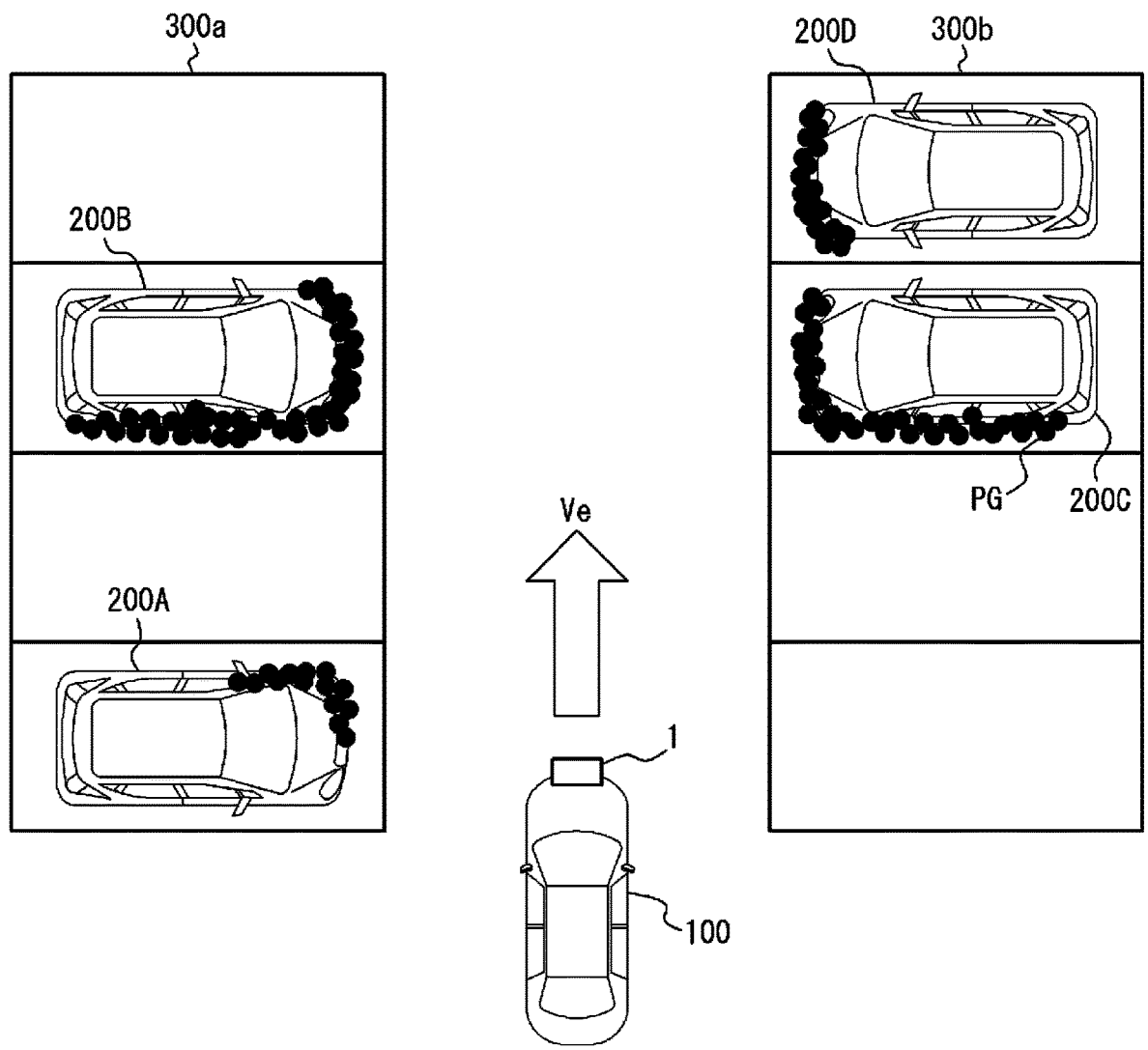
FIG. 10 is a diagram illustrating an example of an operation of the electronic device according to the embodiment.

Next, an example of the effects of the point group superimposition processing performed by the electronic device 1 according to the embodiment will be described. FIG. 8 illustrates an example of results obtained without the electronic device 1 performing the point group superimposition processing as a comparative example for illustrating the effects of point group superimposition processing performed by the electronic device 1 according to the embodiment. FIGS. 9 and 10 illustrates examples of results of the point group superimposition processing performed by the electronic device 1 according to the embodiment.

Let us assume a situation in which four cars (200A, 200B, 200C, and 200D) are already stopped or parked in a car park with car park frame lines 300A and 300B, as illustrated in FIGS. 8 to 10. As illustrated in FIGS. 8 to 10, the cars 200A and 200B are stopped or parked in the car park frame lines 300a. As illustrated in FIGS. 8 to 10, the cars 200C and 200D are stopped or parked in the car park frame lines 300B. In this situation, let us assume an operation in which the mobile object 100 equipped with the electronic device 1 according to the embodiment is moving at a velocity Ve [m/s] in the direction of the arrow. As illustrated in FIGS. 8 to 10, the mobile object 100, which is the host vehicle, may be a vehicle having the electronic device 1 mounted at the front center thereof. The situation illustrated in FIGS. 8 to 10 may be regarded as illustrating numerical simulation results expected when radar point groups are used to detect free spaces in a car park. In FIGS. 8 to 10, a point group PG represents a group of points plotted on the plane of an object detected by the electronic device 1, which is a millimeter wave radar.

As described above, FIG. 8 illustrates an example of a case in which signal processing (point group superimposition processing) is not performed by the electronic device 1 according to the embodiment. As an example, a point group generated from the data of one frame illustrated in FIG. 3 is plotted in FIG. 8. In order to obtain information regarding the shape and/or size of other vehicles (the cars 200A, 200B, 200C, and 200D) that are already parked, the point group PG is desirably plotted as densely as possible. However, when the point group superimposition processing performed by the electronic device 1 is not performed, the spatial density of the generated point group will be relatively low. Therefore, when the point group superimposition processing is not performed by the electronic device 1, the size or shape of the other vehicles, i.e., the cars (200A, 200B, 200C, and 200D), cannot be grasped.

On the other hand, FIGS. 9 and 10 illustrate examples of the distributions of point groups detected as a result of signal processing (point group superimposition processing) performed by the electronic device 1 according to the embodiment. In FIGS. 9 and 10, the density of point groups is improved by superimposing point groups for ten frames of the frame illustrated in FIG. 3, taking into account the movement velocity of the host vehicle. As illustrated in FIG. 9, the electronic device 1 is able to obtain a point group PG that is sufficient to obtain information regarding the shape and/or size of other vehicles (the cars 200A, 200B, 200C, and 200D) that are already parked. Therefore, with the point group superimposition processing of the electronic device 1, it is easy to grasp the size or shape of the other vehicles, i.e., the cars (200A, 200B, 200C, and 200D).

FIG. 10 illustrates an example in which the mobile object 100 illustrated in FIG. 9 progresses further in the car park in the direction of the arrow. Similarly to FIG. 9, FIG. 10 illustrates an example of the distribution of a detected point group as a result of signal processing (point group superimposition processing) performed by the electronic device 1 according to the embodiment. In FIG. 10 as well, the electronic device 1 is able to obtain a point group PG sufficient to obtain information regarding the shape and/or size of other vehicles (the cars 200A, 200B, 200C, and 200D) that are already parked. Therefore, with the point group superimposition processing of the electronic device 1, it is easy to grasp the size or shape of the other vehicles, i.e., the cars (200A, 200B, 200C, and 200D). Therefore, the signal processing (point group superimposition processing) performed by the electronic device 1 according to this embodiment can be applied to applications such as automatic parking systems, for example.

Thus, in the electronic device 1 according to the embodiment, the signal processor 10 detects, for example, the object 200 based on a transmission signal transmitted as a transmission wave and a reception signal received as a reflection wave. The signal processor 10 outputs point group information without superimposing points representing the position of an object determined to be a stationary object, for example, based on the velocity of the object 200 and the velocity of the electronic device 1.

As described above, the electronic device 1 according to the embodiment, for example, can obtain a spatial density for a point group sufficient to obtain the shape and size of a stationary object in millimeter wave radar using electromagnetic waves in the millimeter wave band to monitor short or medium distances. The electronic device 1 according to the embodiment can appropriately superimpose point groups over time while taking into account the relative velocity with respect to other stationary objects. Therefore, the electronic device 1 according to the embodiment can be applied, for example, to radar automatic parking systems or collision avoidance. The electronic device 1 according to the embodiment can improve the accuracy with which an object target is detected. The electronic device 1 according to the embodiment can detect, for example, stationary objects such as trees, fences, walls, buildings, vehicles, and crops with high accuracy.

Second Embodiment

Next, an electronic device 1 according to a Second Embodiment will be described.

The Second Embodiment is obtained by changing some of the processing in the above-described First Embodiment. The electronic device 1 according to the Second Embodiment may have the same configuration or a similar configuration to the electronic device 1 according to the First Embodiment described above. Hereafter, descriptions that overlap with that of the First Embodiment described above will be simplified or omitted as appropriate.

In the First Embodiment described above, as illustrated in Step S12 in FIG. 7, it is assumed that the number of frames N on which point groups are superimposed is calculated as a number that changes dynamically with the velocity of the host vehicle. In contrast, the signal processor 10 of the electronic device 1 according to the Second Embodiment may set the number of frames N on which point groups are to be superimposed as a fixed value Nfix in Step S12 in FIG. 7.

For example, in the Second Embodiment, the signal processor 10 may define the absolute value of the maximum velocity of the host vehicle that may be assumed in free space detection in a car park and so forth. The maximum velocity of the host vehicle defined in this way may be stored in an internal memory of the signal processor 10. Specifically, in the Second Embodiment, the signal processor 10 may determine the number of frames Nfix on which point groups are superimposed as a fixed value, for example, as in the following Equation (5).

[Math 3]

$$N_{fix} = \frac{\Delta r}{T \|Vemax\|} \tag{5}$$

However, in above Equation (5), the following Equation (6) represents the absolute value of the maximum velocity of the host vehicle.

[Math 4]

$$\|Vemax\| \tag{6}$$

In the Second Embodiment, the signal processor 10 may apply Nfix represented by Equation (5) as the number of frames on which point groups are to superimposed at all times.

Thus, in the Second Embodiment, the signal processor 10 may determine the number of the at least one frame of the transmission wave or the reception wave as the number of frames on which point groups are to be superimposed, for example, as a fixed value based on the absolute value of the maximum velocity of the electronic device 1. The electronic device 1 according to the Second Embodiment can reduce the processing load of the signal processor 10, for example, by setting the number of frames on which point groups are to be superimposed to a fixed value.

Third Embodiment

Next, an electronic device 1 according to a Third Embodiment will be described.

The Third Embodiment is also obtained by changing some of the processing in the above-described First Embodiment. The electronic device 1 according to the Third Embodiment may have the same configuration or a similar configuration to the electronic device 1 according to the First Embodiment described above. Hereafter, descriptions that overlap with that of the First Embodiment described above will be simplified or omitted as appropriate.

Figure 11:
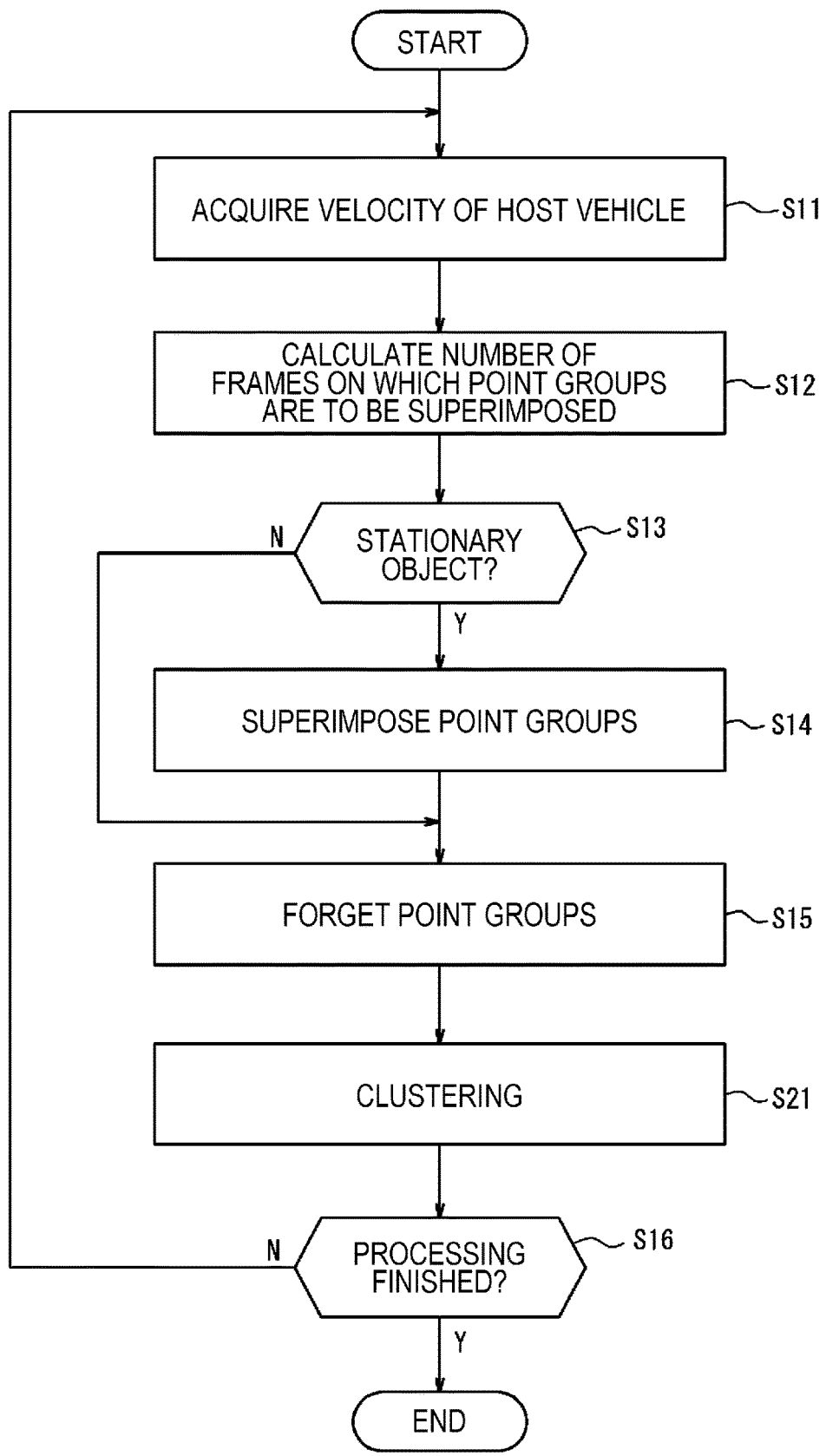
FIG. 11 is a flowchart for describing operation of the electronic device according to the embodiment.

FIG. 11 is a flowchart for describing an operation (signal processing) performed by the signal processor 10 of the electronic device 1 according to the embodiment. FIG. 11 adds clustering process as Step S21 after Step S15, for example, to the operation illustrated in FIG. 7.

As illustrated in FIG. 11, the signal processor 10 may perform clustering processing as Step S21 before Step S16, in which the end of the processing is determined, for example. In this way, point groups classified as noise and not belonging to the object 200 in the surroundings of the mobile object 100 can be removed. Specific processing performed in Step S21 may include, for example, density-based spatial clustering of applications with noise (DBSCAN), a shortest distance method (nearest neighbor method), and a k-means method, and k-means method. In Step S21, the signal processor 10 may perform clustering for all point groups.

Thus, in the Third Embodiment, the signal processor 10 may, for example, perform prescribed clustering processing after forgetting the point group information. The electronic device 1 according to the Third Embodiment can reduce noise generated in signal processing by performing clustering processing.

Fourth Embodiment

Next, an electronic device 1 according to a Fourth Embodiment will be described.

The Fourth Embodiment is also obtained by changing some of the processing in the above-described First Embodiment. The electronic device 1 according to the Fourth Embodiment may have the same configuration or a similar configuration to the electronic device 1 according to the First Embodiment described above. Hereafter, descriptions that overlap with that of the First Embodiment described above will be simplified or omitted as appropriate.

In the First Embodiment described above, the point group forgetting processing illustrated in Step S15 of FIG. 7 was assumed to be performed each time after the superimposition of point groups illustrated in Step S14. In contrast, the signal processor 10 of the electronic device 1 according to the Fourth Embodiment may conditionally perform the point group forgetting process in Step S15 in FIG. 7. For example, when a number of iterations n reaches the number of frame superimpositions N, i.e., n=N, the signal processor 10 may delete and update all point groups in Step S15 in FIG. 7. Thus, in this embodiment, signal processor 10 may perform processing to forget point group information at a prescribed timing.

Thus, the electronic device 1 according to the Fourth Embodiment can reduce the processing load of the signal processor 10, for example, by reducing the number of times the point group forgetting processing is performed.

Fifth Embodiment

Next, an electronic device according to a Fifth Embodiment will be described.

The Fifth Embodiment is obtained by changing part of the configuration of the electronic device 1 according to the First Embodiment described above. In other respects, the electronic device according to the Fifth Embodiment may have the same configuration or a similar configuration to the electronic device 1 according to the First Embodiment described above. Hereafter, descriptions that overlap with that of the First Embodiment described above will be simplified or omitted as appropriate.

Figure 12:
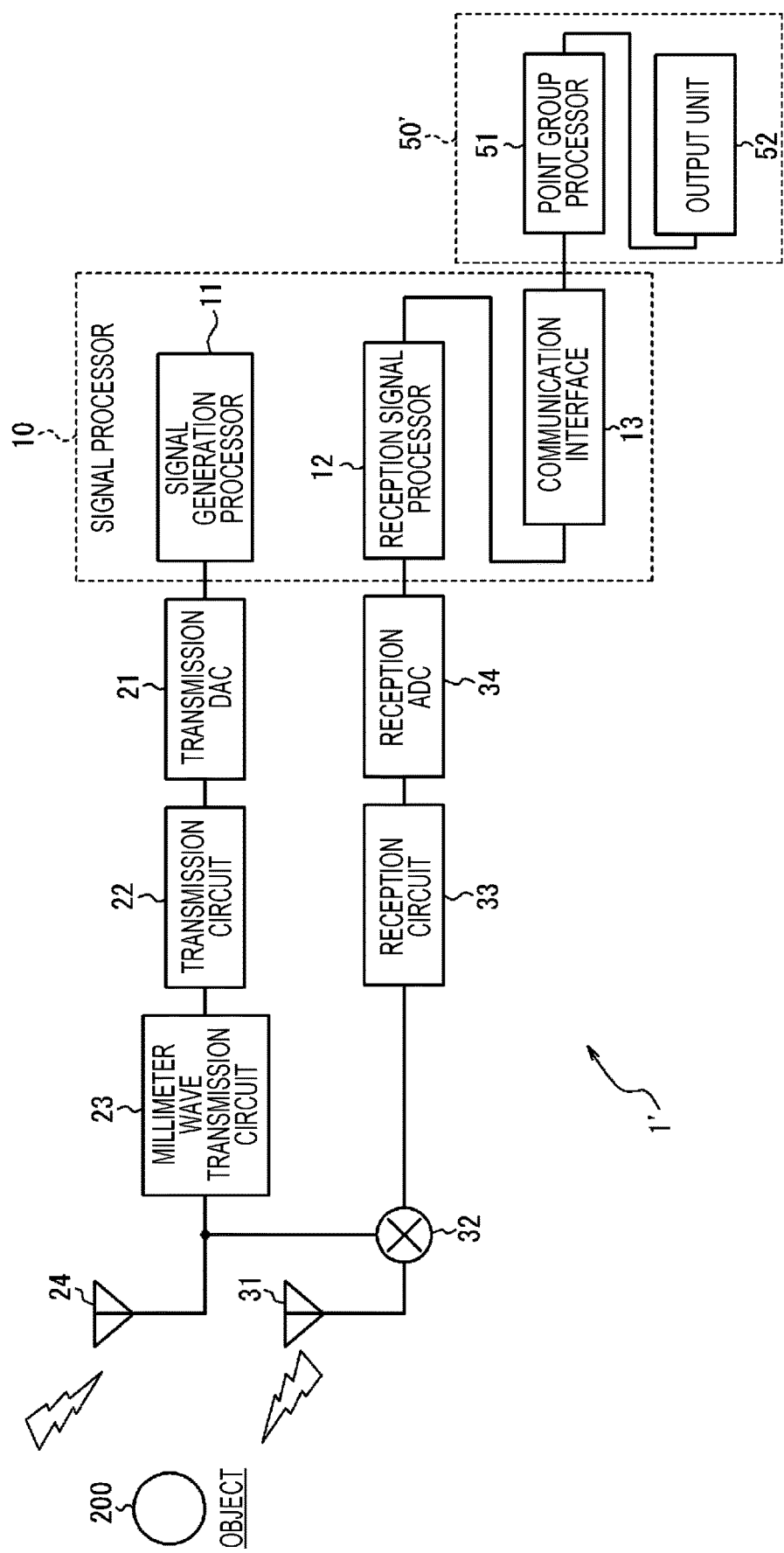
FIG. 12 is a functional block diagram schematically illustrating the configuration of the electronic device according to the embodiment.

FIG. 12 is a functional block diagram schematically illustrating an example configuration of an electronic device 1' according to an embodiment. The electronic device 1' illustrated in FIG. 12 is obtained by changing the controller 50 to a controller 50' in the electronic device 1 illustrated in FIG. 2.

As illustrated in FIG. 12, the controller 50' may include a point group processor 51 and an output unit 52. As illustrated in FIG. 12, the controller 50' may, for example, be a controller provided outside the electronic device 1. The controller 50' may include at least one processor such as a central processing unit (CPU) or a digital signal processor (DSP). In the electronic device 1' illustrated in FIG. 12, the signal processor 10 does not have to perform point group processing. Therefore, in the electronic device 1' illustrated in FIG. 12, the signal processor 10 may output signals, from the communication interface 13 to the controller 50', at a stage prior to processing of detected point groups.

As illustrated in FIG. 12, in the electronic device 1', the point group processing may be performed by the point group processor 51 rather than the signal processor 10. The information resulting from processing of the point groups performed by the point group processor 51 may be output from the output unit 52 or the like. The output unit 52 may be, for example, any display unit (display) that visually displays the plotted point groups.

Thus, the electronic device 1 according to the Fifth Embodiment can reduce the processing load of the signal processor 10, for example, by having the processing of the point groups performed outside the electronic device 1.

Sixth Embodiment

Next, an electronic device according to a Sixth Embodiment will be described.

The Sixth Embodiment is obtained by changing the usage state and operation of the electronic device 1 according to the First Embodiment described above. In other respects, the electronic device according to the Fifth Embodiment may have the same configuration or a similar configuration to the electronic device 1 according to the First Embodiment described above. Hereafter, descriptions that overlap with that of the First Embodiment described above will be simplified or omitted as appropriate.

In the Sixth Embodiment, multiple electronic devices 1 illustrated in FIG. 2 are installed. Hereafter, as an example, a case in which two electronic devices 1 are installed in the mobile object 100 will be described.

Figure 13:
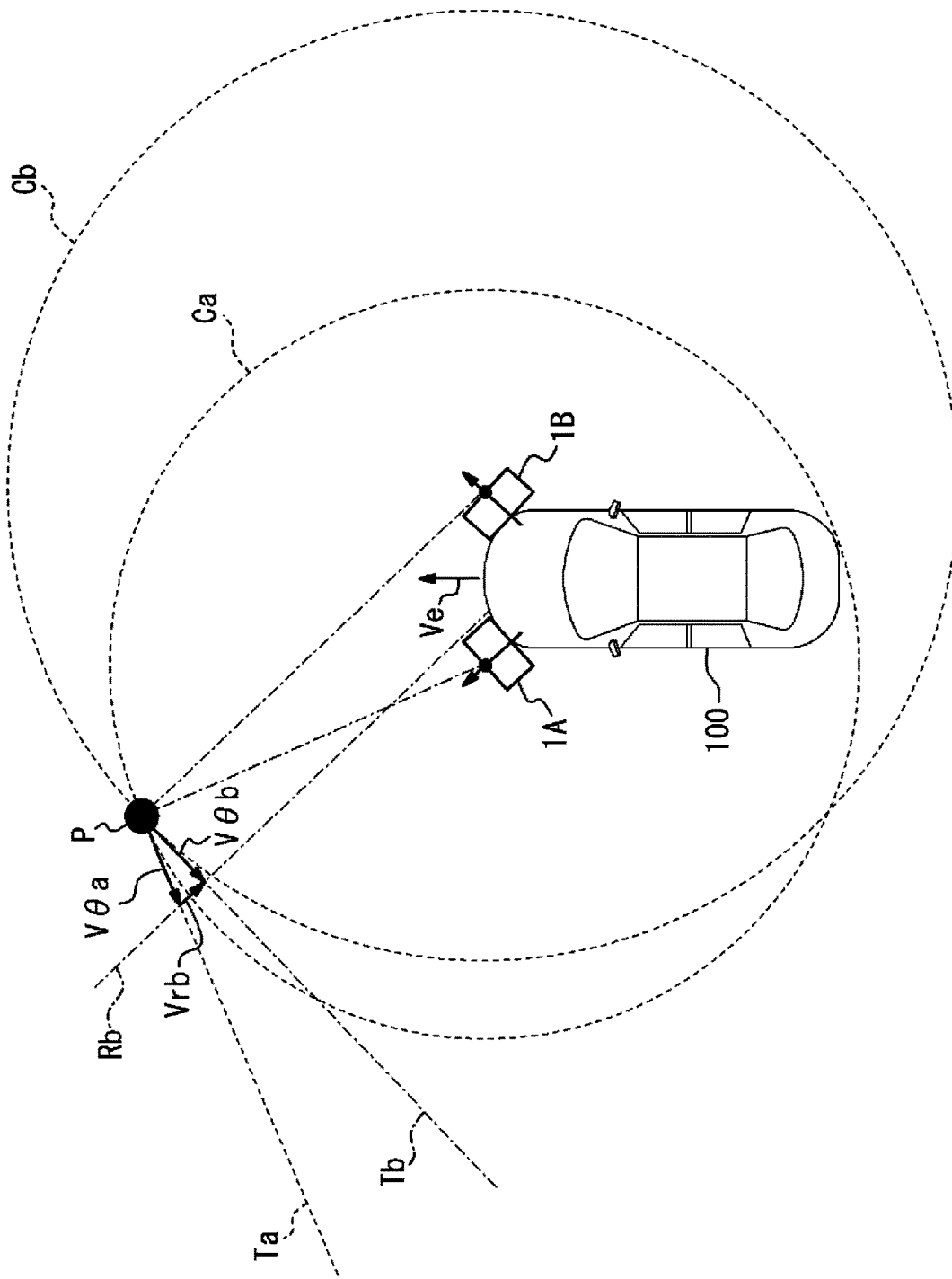
FIG. 13 is a flowchart for describing operation processing of the electronic device according to the embodiment.

FIG. 13 illustrates an example of a situation in which two electronic devices 1 are installed at the front of the mobile object 100. FIG. 13 may illustrate an installation configuration used as corner radars for monitoring the front of the mobile object 100. As illustrated in FIG. 13, a front-left electronic device 1A may be installed at the front left of the mobile object 100. In addition, a front-right electronic device 1B may be installed at the front right of the mobile object 100. Hereafter, when not being specifically distinguished between, the electronic device 1A and electronic device 1B may be simply referred to as an "electronic device 1".

For example, when measuring the velocity of the object 200 in determination of whether the object 200 is a stationary object in Step S13 illustrated in FIG. 7, it is assumed that the velocity of a certain point group only has a tangential component to concentric circles of radio waves transmitted and received by a single electronic device 1. With the installation configuration illustrated in FIG. 13, even if the velocity only has a tangential component to a concentric circle of the radio waves transmitted and received by one electronic device 1 (for example, the electronic device 1A), the radial velocity can be detected by another electronic device 1 (for example, the electronic device 1B). Therefore, it is easier to make appropriate judgments with the electronic device 1A and the electronic device 1B.

P illustrated in FIG. 13 is a certain measurement point on a point group detected by the electronic devices 1A and 1B. Measurement points measured by electronics 1A and 1B do not completely overlap at the same location. However, only one measurement point P is illustrated in the figure assuming a case where the electronic device 1A and the electronic device 1B each generate a measurement point at coordinates in space in close proximity to each other. In reality, it is necessary for the signal processor 10, for example, to perform processing in order to integrate the velocities of the nearby measurement points generated by the electronic device 1A and the electronic device 1B.

A dashed circle Ca illustrated in FIG. 13 illustrates a concentric circle for the electronic device 1A. A dashed circle Cb illustrated in FIG. 13 illustrates a concentric circle for the electronic device 1B. A dashed line Ta represents a tangential line at the point P on the concentric circle Ca of electronic device 1A. A single-dot chain line Tb represents a tangential line at the point P on the concentric circle Cb of the electronic device 1B. A single-dot chain line Rb represents a radius vector at the point P on the concentric circle Cb of the electronic device 1B.

In the example illustrated in FIG. 13, an extreme case is assumed. In other words, in the example illustrated in FIG. 13, it is assumed that the velocity V of the measurement point P only has a tangential component with respect to the electronic device 1A. As illustrated in FIG. 13, the velocity V of the measurement point P has a magnitude of yea in the direction of the dashed line Ta. Even in this extreme case, the measurement point P will have a radial velocity Vrb with respect to the electronic device 1B. Therefore, with the electronic device 1A and the electronic device 1B, it is possible to determine whether the object 200 is stationary or not even in the extreme case described above.

Next, processing for integrating the velocities of spatially close measurement points respectively detected by the electronic device 1A and the electronic device 1B will be described.

Figure 14:
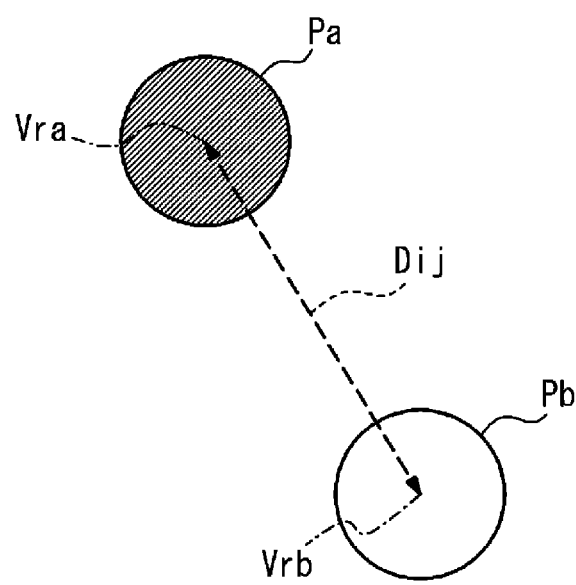
FIG. 14 is a flowchart for describing operation processing of the electronic device according to the embodiment.

FIG. 14 is a diagram for describing an example of processing for integrating the velocities of two spatially close measurement points performed by the signal processor 10. As illustrated in FIG. 14, it is assumed that an i-th measurement point Pa, detected by the electronic device 1A, and a j-th measurement point Pb, detected by the electronic device 1B, are close to each other at a distance Dij. As illustrated in FIG. 14, the i-th measurement point Pa detected by the electronic device 1A is assumed to have a radial velocity Vra. The j-th measurement point Pb detected by the electronic device 1B is assumed to have a radial velocity Vrb. In an embodiment, the signal processor 10 may rewrite the velocity vector by adopting the larger absolute value out of the respective radial velocities Vra and Vrb when the distance Dij is less than or equal to a prescribed distance threshold ε.

In other words, if V'ra and V'rb represent the velocity vectors after the processing of updating the velocities, respectively, the velocity vectors can be expressed as follows.

If the magnitude of the velocity vector Vra in the radial direction is smaller than the magnitude of the velocity vector Vrb in the radial direction, the velocity vector Vrb may be adopted as the velocity vectors V'ra and V'rb.

If the magnitude of the velocity vector Vra in the radial direction is larger than the magnitude of the velocity vector Vrb in the radial direction, the velocity vector Vra may be adopted as the velocity vectors V'ra and V'rb.

If the magnitude of the velocity vector Vra in the radial direction is the same as the magnitude of the velocity vector Vrb in the radial direction, the velocity vector Vra may be adopted as the velocity vector V'ra and the velocity vector Vrb may be adopted as the velocity vector V'rb.

By performing the processing for integrating the velocities of the two measurement points as described above, the electronic device 1 can reduce the possibility of measurement points and point groups belonging to objects that are not actually stationary being misjudged as belonging to objects that are stationary. Therefore, the electronic device 1 according to this embodiment can more accurately determine whether an object is a stationary object or a moving object in the shared detection range of the two electronic devices 1.

When performing the processing for integrating the velocities of the two measurement points as described above, the signal processor 10 lists the measurement points Pa and Pb for which the distance Dij is less than or equal to the prescribed distance threshold ε. In this case, the signal processor 10 may, for example, search the indices i and j of the distance Dij in a brute force manner for all measurement points Pa and Pb within the point groups respectively generated by the electronic device 1A and the electronic device 1B. With this processing, the signal processor 10 may list the measurement points Pa and Pb for which Dij<ε.

After the processing for integrating the velocities of the two measurement points, the signal processor 10 may generate an integrated point group P by taking the union of point groups P1 and P2 generated by the electronic device 1A and the electronic device 1B. In other words, the signal processor 10 may generate an integrated point group P from point groups P1 and P2 that satisfy the following Equation (7).

$$P = P1 \cup P2 \quad (7)$$

In general, when two or more electronic devices 1 are used, the integrated point group P can be represented by the following Equation (8) by taking the union of sets F formed by multiple electronic devices 1.

[Math 5]

$$P = \bigcup_{k \in \Gamma} Pk \quad (8)$$

Next, operation of the electronic devices 1A and 1B according to a Sixth Embodiment will be described.

Figure 15:
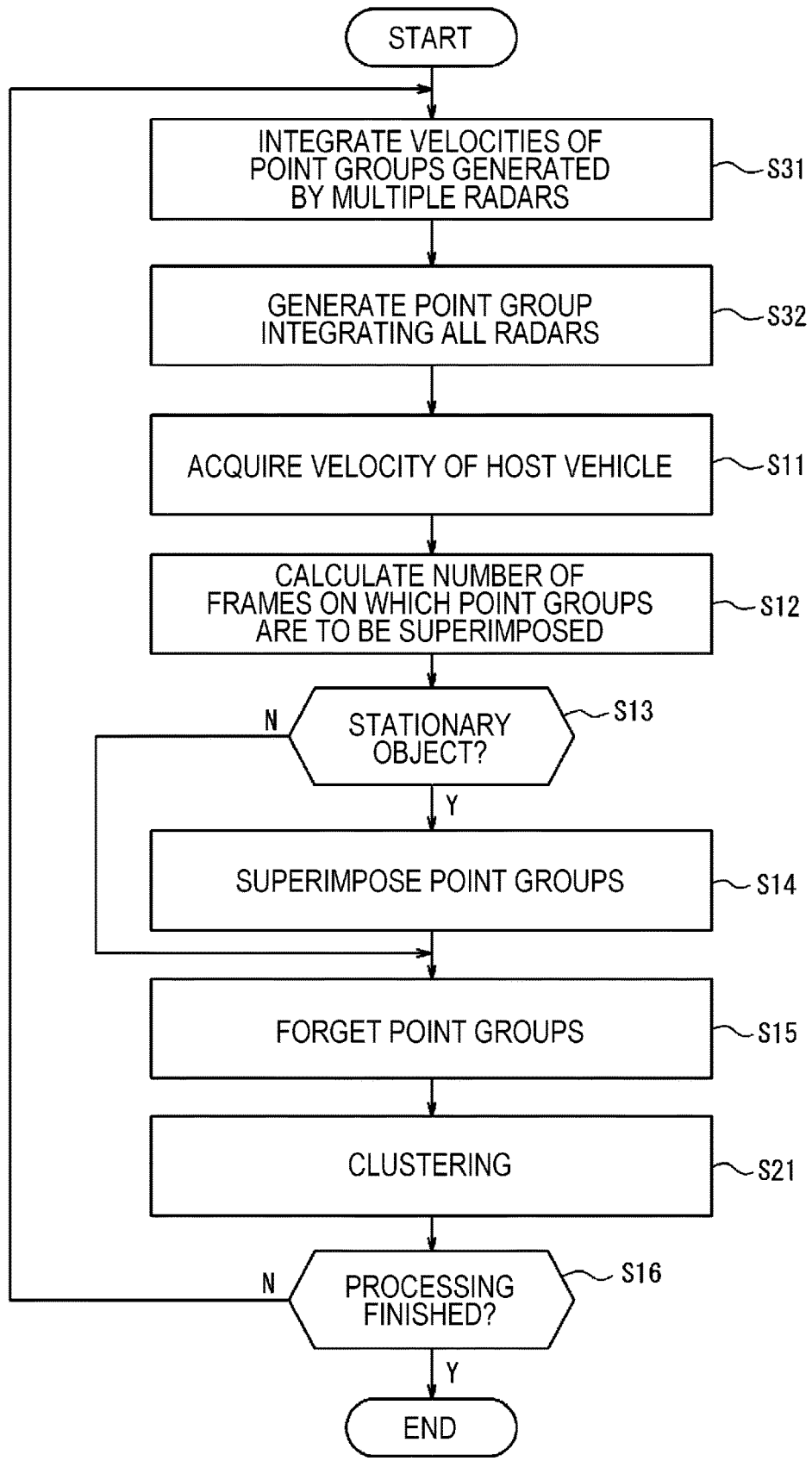
FIG. 15 is a flowchart for describing operation of the electronic device according to the embodiment.

FIG. 15 is a flowchart for describing an operation (signal processing) performed by the signal processor 10 of the electronic device 1 according to the embodiment. FIG. 15 is obtained, for example, by adding Steps S31 and S32 before Step S11 in the operation illustrated in FIG. 11. The operation illustrated in FIG. 15 may be performed by the signal processor 10 of either or both of the electronic devices 1A and 1B. The operation illustrated in FIG. 15 may be performed by a controller provided outside the electronic devices 1A and 1B.

In a configuration in which two or more radars are used, the signal processor 10 may perform processing for integrating the velocities of point groups generated by the multiple radars as Step S31 after starting the operation illustrated in FIG. 15. Once the processing illustrated in Step S31 has been performed, the signal processor 10 may perform processing for generating a point group integrating all the electronic devices 1 (for example, radars) as Step S32.

In the operation illustrated in FIG. 15, the signal processor 10 may perform the same or a similar operation to as in FIG. 11 after performing the processing of Steps S31 and S32.

Thus, in the Sixth Embodiment, the signal processor 10 may detect objects based on transmission signals transmitted from multiple positions as transmission waves and reception signals received at multiple positions as reflection waves. In this case, the signal processor 10 may integrate the velocities of the point groups generated as a result of detecting an object based on a transmission signal and a reception signal. In this case, the signal processor 10 may integrate the velocities of the point groups and then output information about the point groups based on the results on detecting an object based on the transmission and reception signals. In the Sixth Embodiment, multiple electronic devices 1 are provided and point groups can be detected with good accuracy. Therefore, it is easier to make appropriate judgments with the electronic device 1.

The present disclosure has been described based on the drawings and examples, but it should be noted that a variety of variations and amendments may be easily made by one skilled in the art based on the present disclosure. Therefore, it should be noted that such variations and amendments are included within the scope of the present disclosure. For example, the functions included in each functional part can be rearranged in a logically consistent manner. Multiple functional parts and so forth may be combined into a single part or divided into multiple parts. Furthermore, each embodiment according to the present disclosure described above does not need to be implemented exactly as described in the embodiment, and may be implemented with some features having been combined or omitted as appropriate. A variety of variations and amendments to the content of the present disclosure can be made by one skilled in the art based on the present disclosure. Accordingly, such variations and amendments are included in the scope of the present disclosure. For example, in each embodiment, each functional part, each means, each step and so on can be added to other embodiments so long as there are no logical inconsistencies, or can be replaced with each functional part, each means, each step, and so on of other embodiments. In each embodiment, a plurality of each functional part, each means, each step, and so on can be combined into a single functional part, means, or step or divided into multiple functional parts, means, or steps. Each of the above-described embodiments of the present disclosure is not limited to faithful implementation of each of the described embodiments, and may be implemented by combining or omitting some of the features as appropriate.

The above-described embodiments are not limited to only being implemented as the electronic device 1. For example, the embodiments described above may be implemented as a method of controlling a device such as the electronic device 1. For example, the embodiments described above may be implemented as a program executed by a device such as the electronic device 1.

REFERENCE SIGNS 1, 1' electronic device
10 signal processor
11 signal generation processor
12 reception signal processor
13 communication interface
21 transmission DAC
22 transmission circuit
23 millimeter wave transmission circuit
24 transmission antenna array
31 reception antenna array
32 mixer
33 reception circuit
34 reception ADC
50, 50' controller
51 point group processor
52 output unit

The invention claimed is:

1. An electronic device comprising:
a transmission antenna configured to transmit a transmission wave;
a reception antenna configured to receive a reflection wave resulting from reflection of the transmission wave; and
a signal processor configured to detect an object based on a transmission signal transmitted as the transmission wave and a reception signal received as the reflection wave,
wherein the signal processor outputs information regarding a point group representing a position of an object determined to be a stationary object based on a velocity of the object and a velocity of the electronic device,
the signal processor outputs information regarding the point group by superimposing a position of an object determined to be a stationary object in a time period defined by at least one frame of the transmission wave or the reflection wave, and
the signal processor determines a number of frames of the at least one frame of the transmission wave or the reflection wave in accordance with a velocity of the electronic device.

2. The electronic device according to claim 1,
wherein the signal processor outputs information regarding the point group by superimposing points representing a position of an object determined to be a stationary object based on the velocity of the object and the velocity of the electronic device.

3. The electronic device according to claim 1,
wherein the signal processor outputs information regarding the point group without superimposing points representing a position of an object determined not to be a stationary object based on the velocity of the object and the velocity of the electronic device.

4. The electronic device according to claim 1,
wherein when the velocity of the electronic device is not zero, the signal processor determines the number of frames of the at least one frame of the transmission wave or the reflection wave based on an acceptable range of error for a distance from the electronic device to the object.

5. The electronic device according to claim 1,
wherein when the velocity of the electronic device is zero, the signal processor determines the number of frames of the at least one frame of the transmission wave or the reflection wave based on a maximum number permitted in a system of the electronic device.

6. The electronic device according to claim 1,
wherein the signal processor determines the number of frames of the at least one frame of the transmission wave or the reflection wave as a fixed value based on an absolute value of a maximum velocity of the electronic device.

7. The electronic device according to claim 1,
wherein the signal processor performs processing for forgetting the information regarding the point group at a prescribed timing.

8. The electronic device according to claim 1,
wherein the signal processor performs prescribed clustering processing after forgetting the information regarding the point group.

9. The electronic device according to claim 1,
wherein the signal processor detects an object based on a transmission signal transmitted from multiple positions as the transmission wave and a reception signal received at multiple positions as the reflection wave.

10. The electronic device according to claim 9,
wherein the signal processor integrates velocities of a point group generated as a result of detecting an object based on the transmission signal and the reception signal.

11. The electronic device according to claim 9,
wherein the signal processor integrates velocities of a point group and then outputs information regarding the point group based on a result of detecting an object based on the transmission signal and the reception signal.

12. The electronic device according to claim 1,
wherein the electronic device is installed on or in a prescribed mobile object, and
the signal processor acquires information regarding a velocity of the electronic device, as a velocity of the mobile object, from a controller configured to control the mobile object.

13. A method for controlling an electronic device, the method comprising:
transmitting a transmission wave using a transmission antenna;
receiving a reflection wave resulting from reflection of the transmission wave using a reception antenna;
detecting an object based on a transmission signal transmitted as the transmission wave and a reception signal received as the reflection wave;
outputting information regarding a point group representing a position of an object determined to be a stationary object based on a velocity of the object and a velocity of the electronic device, wherein the outputting includes outputting information regarding the point group by superimposing a position of an object determined to be a stationary object in a time period defined by at least one frame of the transmission wave or the reflection wave; and
determining a number of frames of the at least one frame of the transmission wave or the reflection wave in accordance with a velocity of the electronic device.

14. A non-transitory computer-readable recording medium storing computer program instructions, which when executed by a computer, cause the computer to:
transmit a transmission wave using a transmission antenna;
receive a reflection wave resulting from reflection of the transmission wave using a reception antenna;
detect an object based on a transmission signal transmitted as the transmission wave and a reception signal received as the reflection wave;
output information regarding a point group representing a position of an object determined to be a stationary object based on a velocity of the object and a velocity of an of the electronic device, wherein the program instructions cause the computer to output information regarding the point group by superimposing a position of an object determined to be a stationary object in a time period defined by at least one frame of the transmission wave or the reflection wave; and
determine a number of frames of the at least one frame of the transmission wave or the reflection wave in accordance with a velocity of the electronic device.

* * * * *